May 9, 1967
J. R. BENNETT
3,319,056
MULTIPLICATION UNIT OPERATING SERIALLY BY
DIGIT AND PARALLEL BY BIT
Original Filed May 7, 1962
12 Sheets-Sheet 4
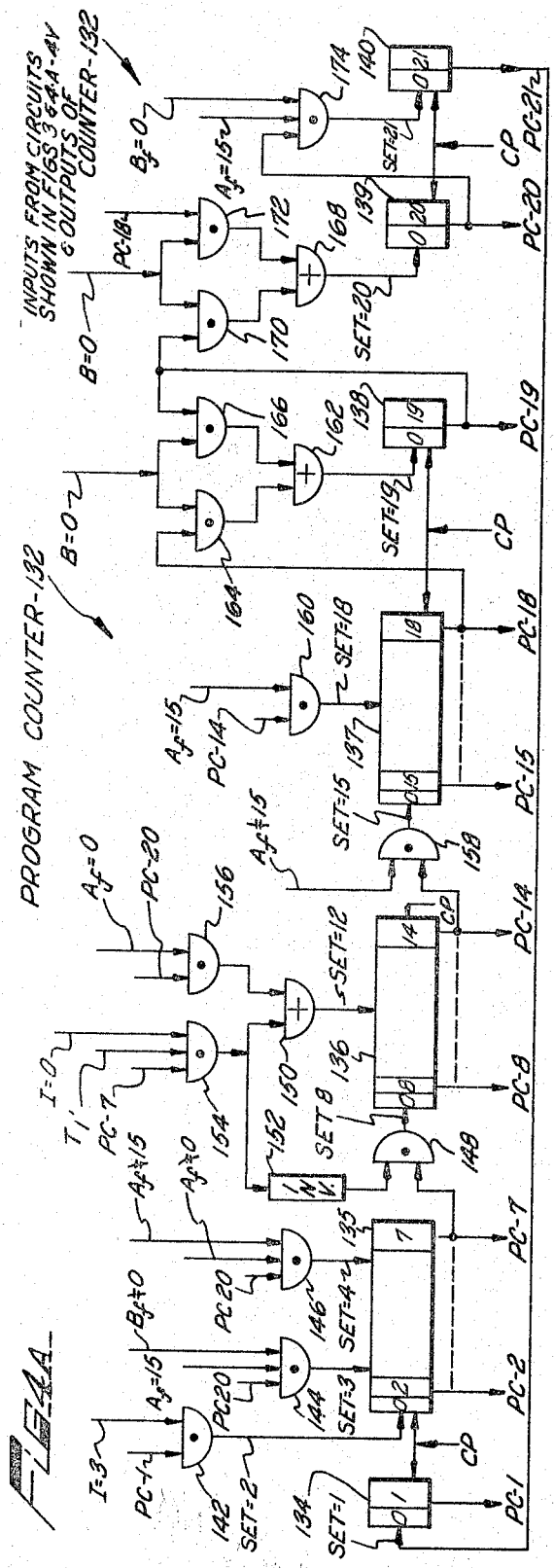
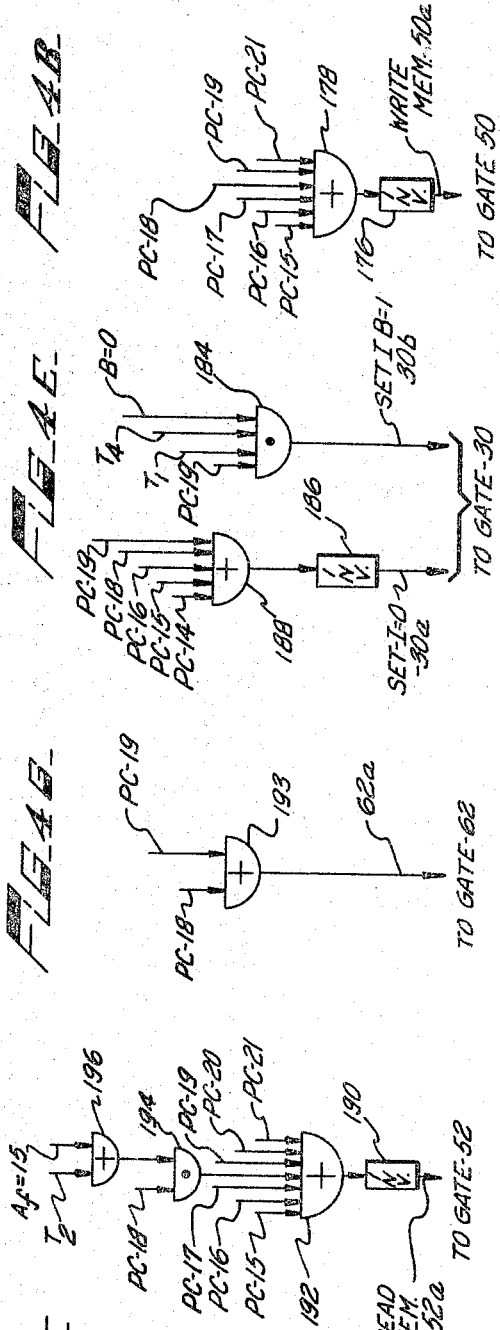
INVENTOR.
JAMES R. BENNETT
BY
Christie, Parker & Hale
ATTORNEYS.

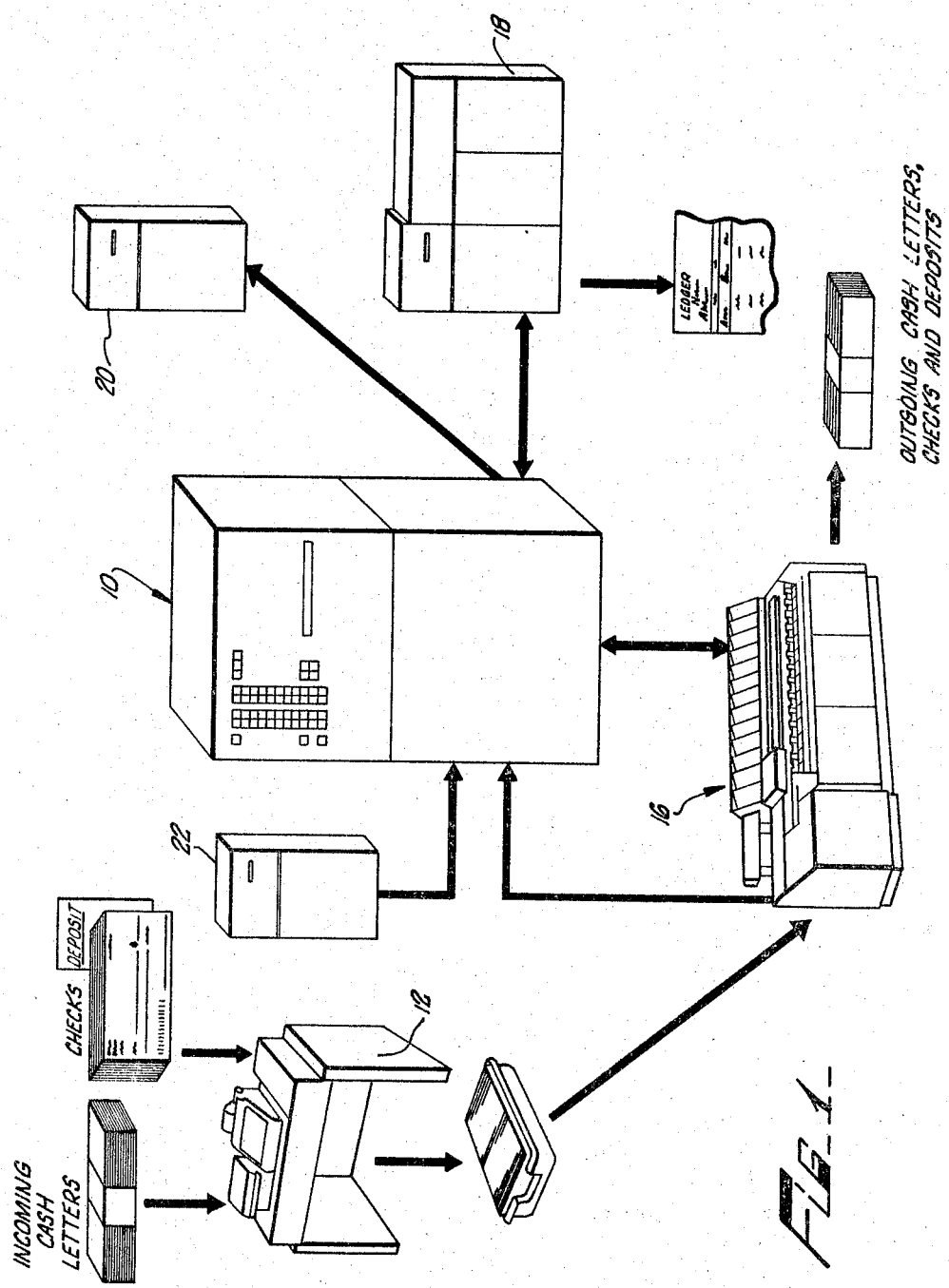

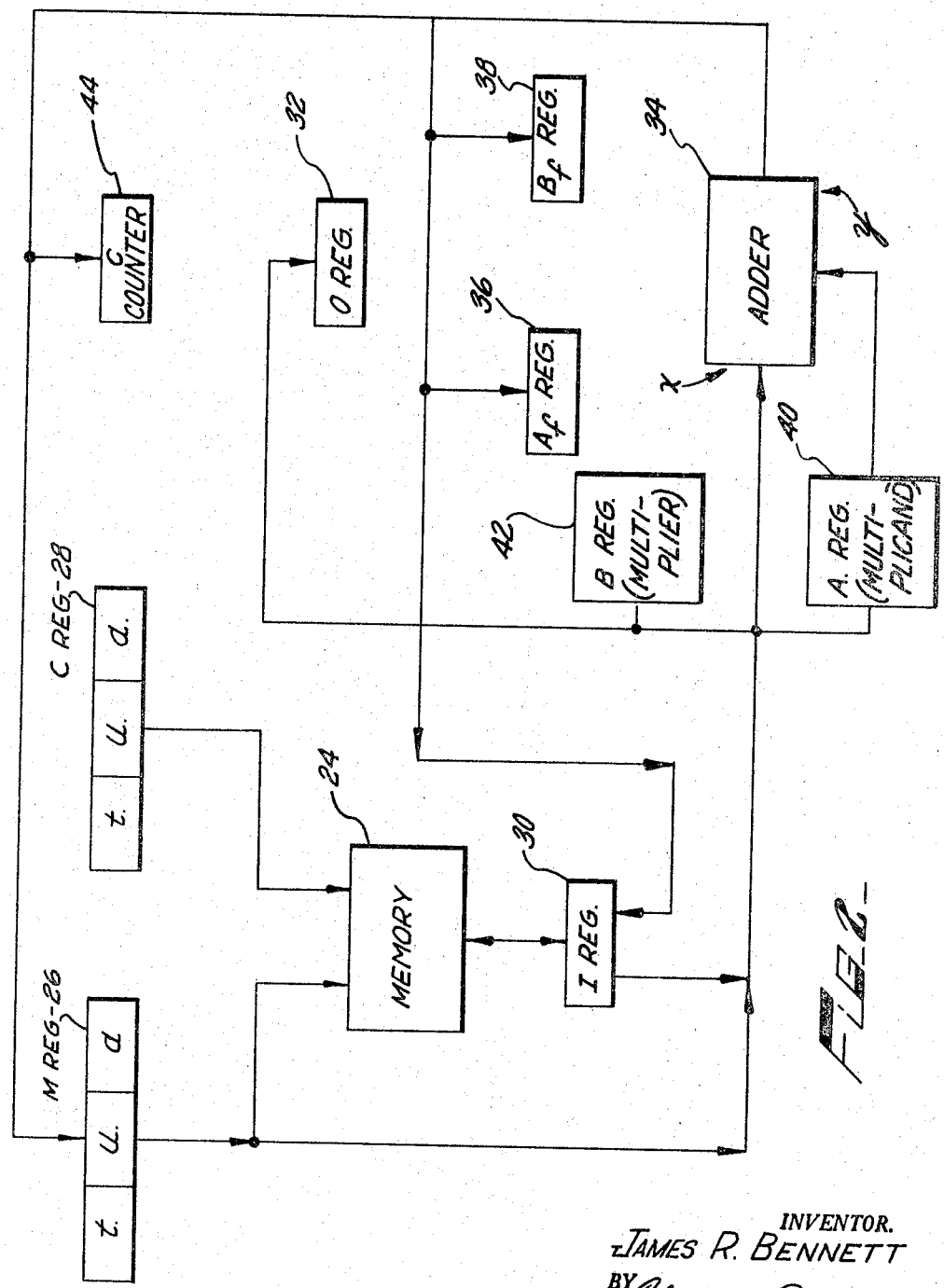

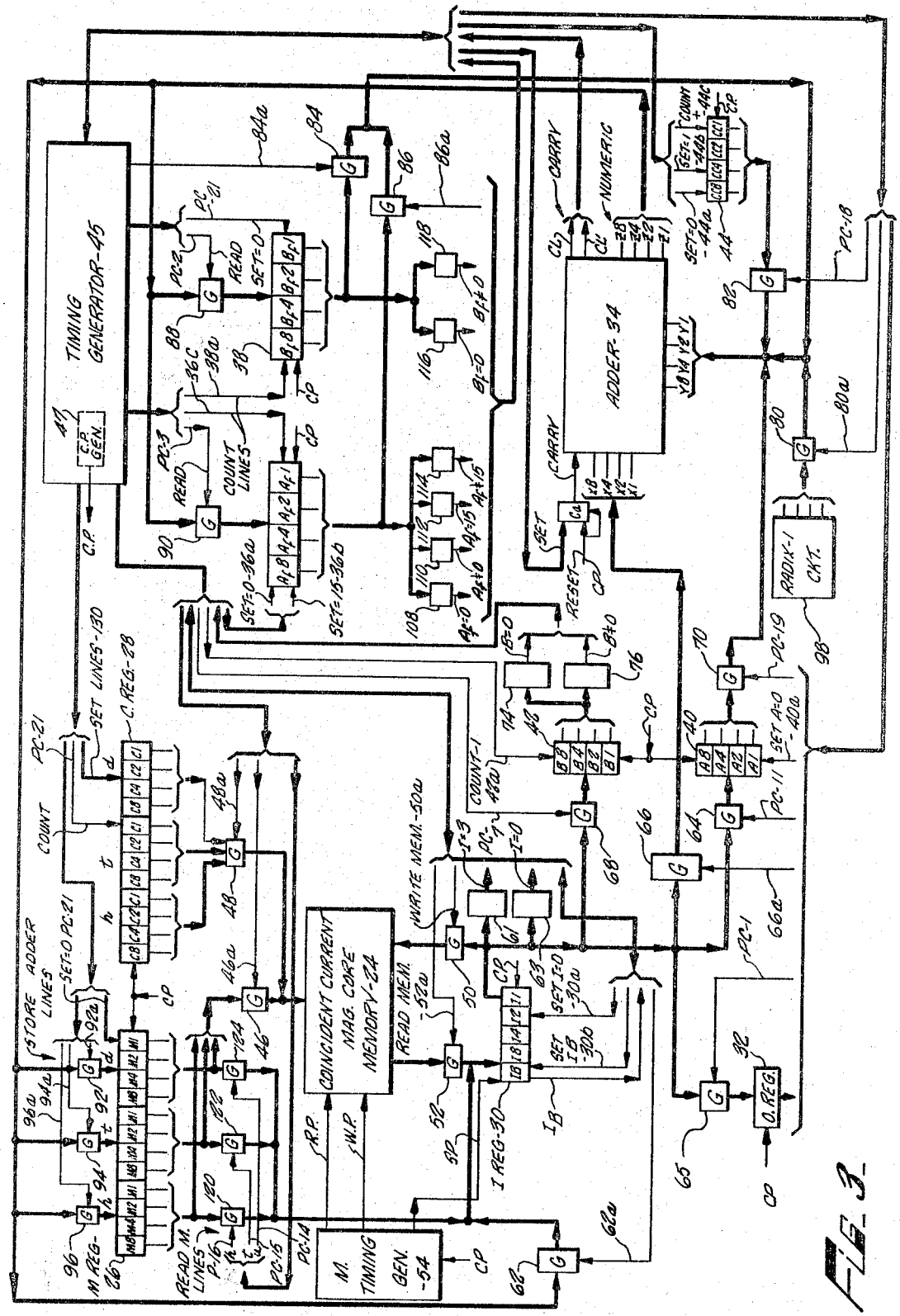

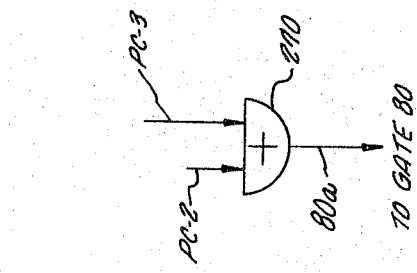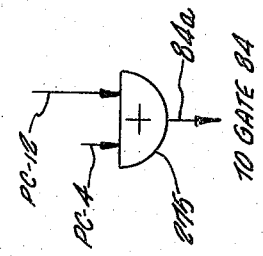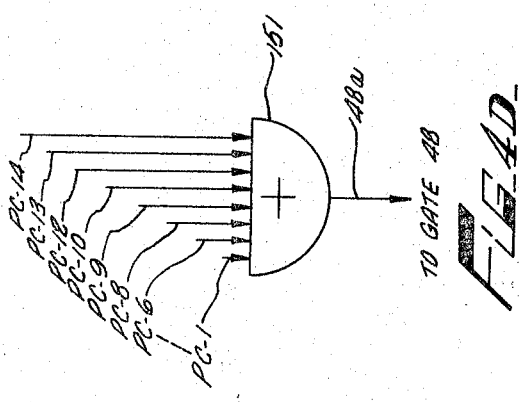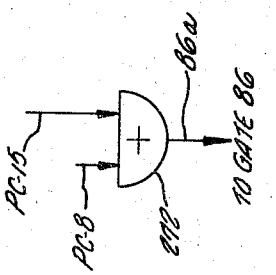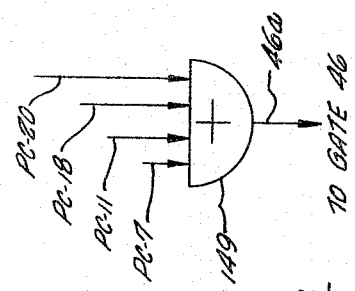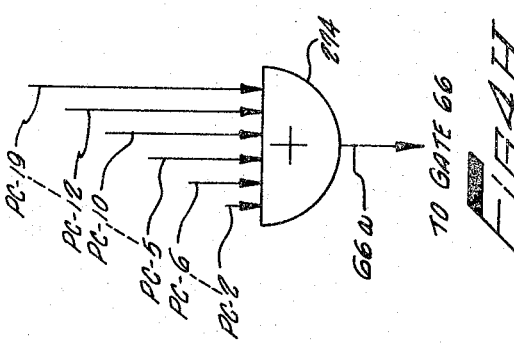

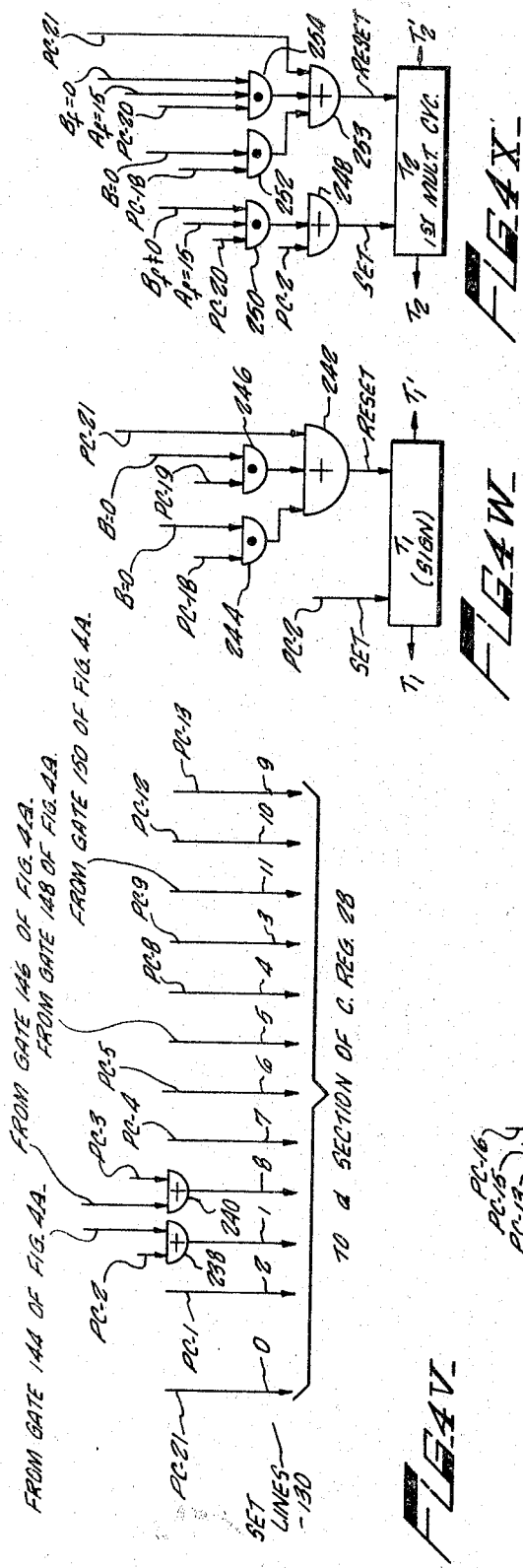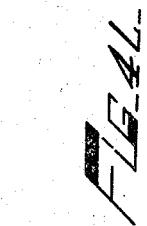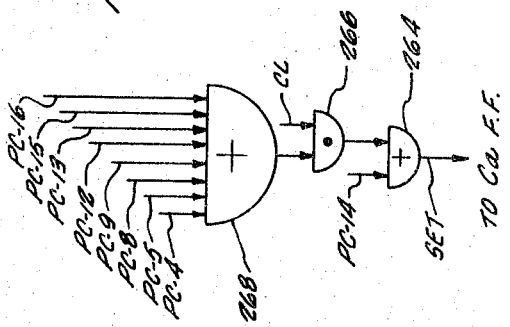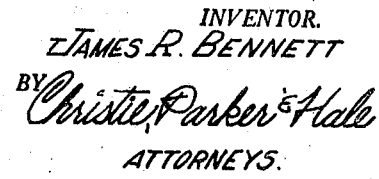

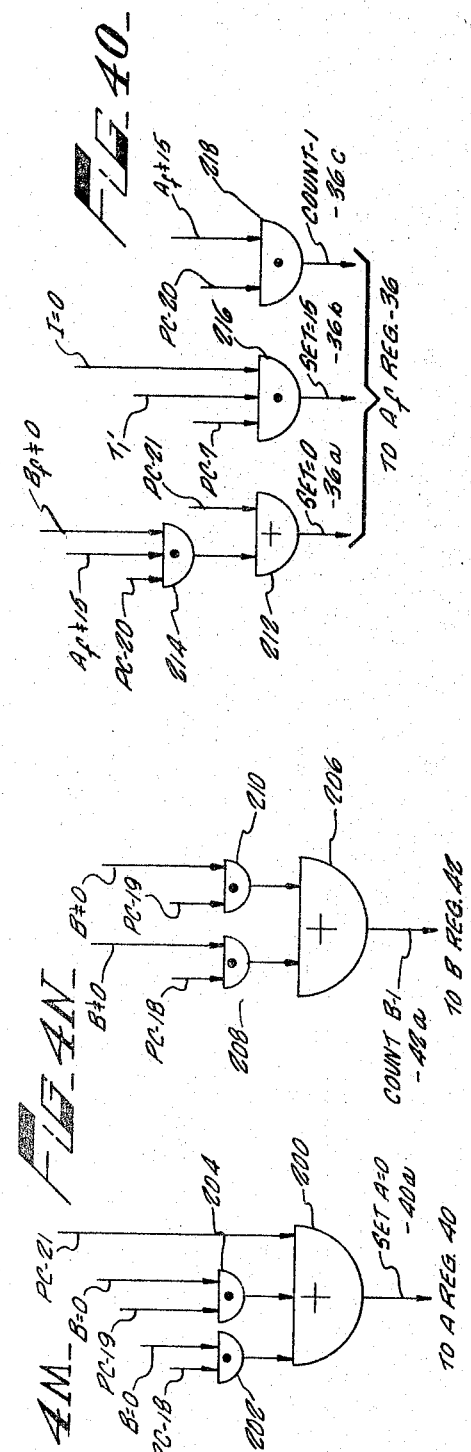

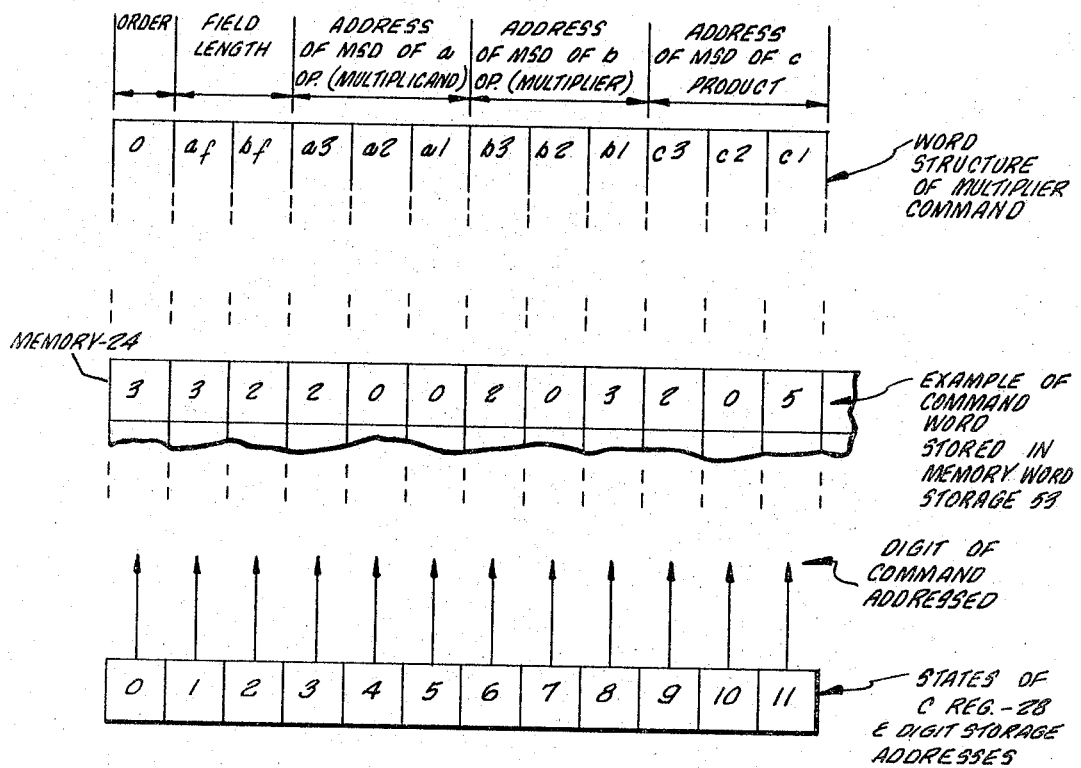
FIG_9_
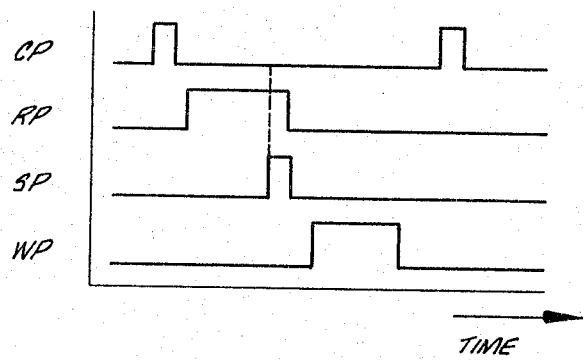
FIG_5_

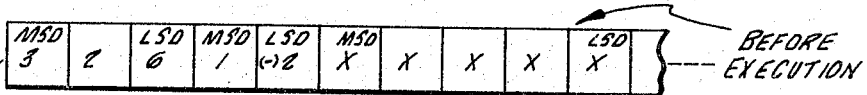
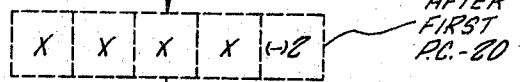
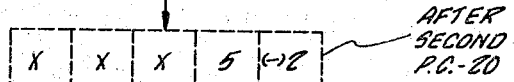
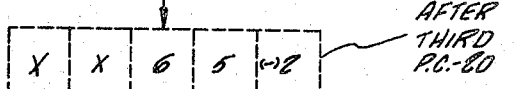
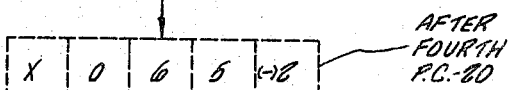
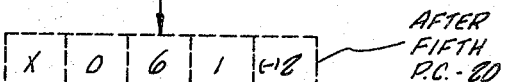
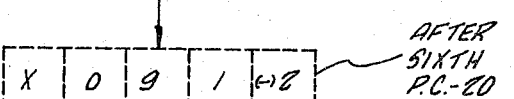
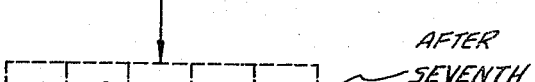
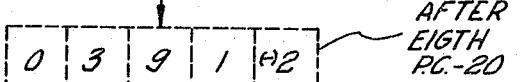
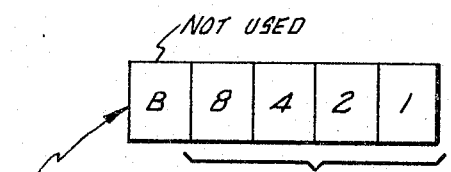

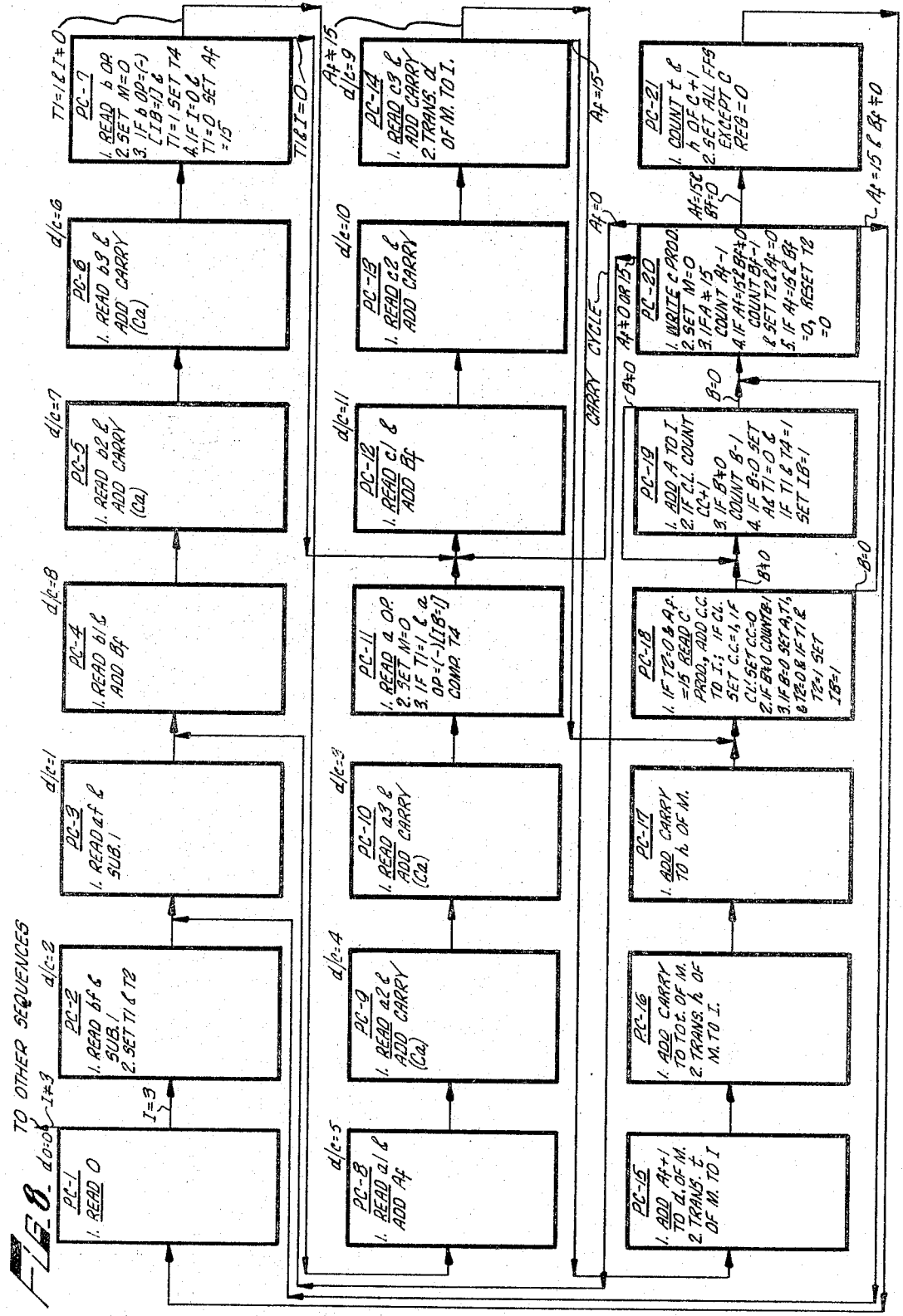

United States Patent Office 3,319,056
Patented May 9, 1967

3,319,056
MULTIPLICATION UNIT OPERATING SERIALLY BY DIGIT AND PARALLEL BY BIT
James R. Bennett, Glendora, Calif., assignor to Burroughs Corporation, Detroit, Mich., a corporation of Michigan
Continuation of application Ser. No. 192,885, May 7, 1962.
This application Nov. 19, 1965, Ser. No. 513,644
14 Claims. (Cl. 235—159)

This invention relates to digital computers and more particularly to improvements in apparatus for performing multiplication in a digital data processor.

This case is a continuation of a previously filed application Ser. No. 192,885, filed May 7, 1962, now abandoned, by the same inventor as this patent application.

Generally, scientific computers have three registers for storing the full multiplier operand, the full multiplicand operand, and the full product word for performing multiplication. Multiplication is performed by reading out the multiplier and multiplicand operands and storing them in the corresponding registers and then adding the whole multiplicand operand to the contents of the product register the number of times indicated by the magnitude of the multiplier operand. With this arrangement, separate registers are needed for storing the complete operands and the complete product. Another prior art arrangement utilizes an accumulator register for the dual purpose of storing the multiplier and the product.

Both of the aforementioned prior art arrangements duplicate storage units. For example, a product storage field is provided in the memory of the computer for storing the complete product. However, information is stored in the product field of the memory only after the multiplication operation is complete and a complete product has been obtained. Thus, in the first example storage is provided for the complete product both in memory and in the additional product register. Both of the aforementioned prior art arrangements not only have operand fields in the memory for storing the complete multiplier and multiplicand operands, but have additonal registers for storing the complete multiplicand and multiplier operands external of the memory.

In a serial computer only one bit of the multiplicand and multiplier operands are used at any one instant in time to perform multiplication. Additionally, the reading and writing circuits for the memory unit of most computer machines are normally used inefficiently in that they are used only about 25% of the total computing time. One reason for the inefficient use of memory is that operand and product addresses of each command are read out of the memory only once. Also, as discussed above, the product is written only when complete. However, such an arrangement is necessary in scientific computing machines where extremely high computing speeds are necessary.

A digital data processor processes data from peripheral data units. Generally data is supplied for processing at a low rate. The rate at which peripheral data units receive data is similarly at a low rate. The speed with which data is received, processed and shifted back out to other peripheral units is limited, not by computing or processing speed, but by the rate at which data is made available to the processor and read out therefrom. Thus, a digital data processor may reduce the rate at which data is processed as compared with scientific computing machines and yet overall system speed will remain constant.

However, present data processors normally use the scientific computer machine arrangement for performing multiplication even in view of the duplication of equipment and inefficient use of memory.

In contrast, a specific embodiment of the present invention is a multiplication unit for performing multiplication in much the same way as that taught in grammar school. For example, the multiplier and multiplicand operands are arranged in digits. The low order digit of the multiplier is multiplied times each digit of the multiplicand and for each multiplicand digit multiplied a corresponding partial product digit is formed. After one multiplier digit has been multiplied times all multiplicand digits, the next higher order multiplier digit is multiplied times each digit of the multiplicand. However, in contrast to the grammar school method of multiplication, the partial product digit of each multiplication is added to the same order partial product digit formed during previous multiplications concurrently with the forming thereof.

Also, in contrast to the prior art multiplication apparatus and method for performing multiplication, the present invention allows a data processor to be built with minimum number and size of auxiliary registers. Also, the memory of a digital data processor embodying the present invention may be used to its maximum efficiency without making unnecessary memory accesses.

Additionally, a multiplication unit in one embodiment of the present invention operates serially by digit but parallel by bit. Normally peripheral units supply data to the data processor in the form of digits. Therefore, by processing digits of information, the multiplication unit becomes much more compatible with the peripheral data handling equipment than in computing machines performing multiplication serially, a bit at a time. Also, operating serially a digit at a time is much faster than operating serially on each bit of a word.

Briefly, a specific embodiment of the present invention comprises a multiplication unit for a data processor including an addressable memory with multiplier and multiplicand operands arranged in digits and written therein. Means is provided for repeatedly reading out of the memory each of the digits of a multiplicand operand concurrently with the reading out of each digit of the multiplier operand. Means is provided for storing one multiplier digit and one multiplicand digit read out of the memory. Means is provided for combining the stored multiplier and multiplicand digits together for developing a partial product digit. Means is provided for writing the developed partial product digit in the memory. Means is provided for reading out of the memory a partial product digit concurrently with the developing of the corresponding partial product digit to be combined therewith. The combining means is additionally arranged for combining the read out partial product digit with the corresponding partial product digit being developed for developing a complete partial product digit until a complete product composed of partial product digits is written in the memory.

A more complete understanding of the present invention may be obtained with reference to the following description of the figures of which:

FIGURE 1 is a pictorial view of a banking system and embodying the present invention;

FIGURE 2 is a general block diagram of a multiplication unit for the digital data processor of FIGURE 1 and embodying the present invention;

FIGURE 3 is a more detailed block diagram of the multiplication unit for the digital data processor of FIGURE 1 and embodying the present invention;

FIGURES 4A through 4Y are schematic diagrams showing the details of the timing generator of FIGURE 3;

FIGURE 5 is a wave shape diagram showing the control pulses for sequencing the operation of the memory unit of FIGURES 2 and 3.

FIGURE 6 is a sketch illustrating the word structure of operand and product digits used in the multiplication unit of FIGURES 2 and 3.

FIGURE 7 is a sketch illustrating the structure of command digits for use in the multiplication unit of FIGURES 2 and 3.

FIGURE 8 is a flow diagram illustrating the sequence of operation of the designated registers, timing flip-flops and the memory unit of the multiplication unit of FIGURES 2 and 3;

FIGURE 9 is a sketch illustrating the structure of a multiplication command word and the corresponding states of the command register necessary to address the digits of the command along with an example of a command word;

Figure 11A:
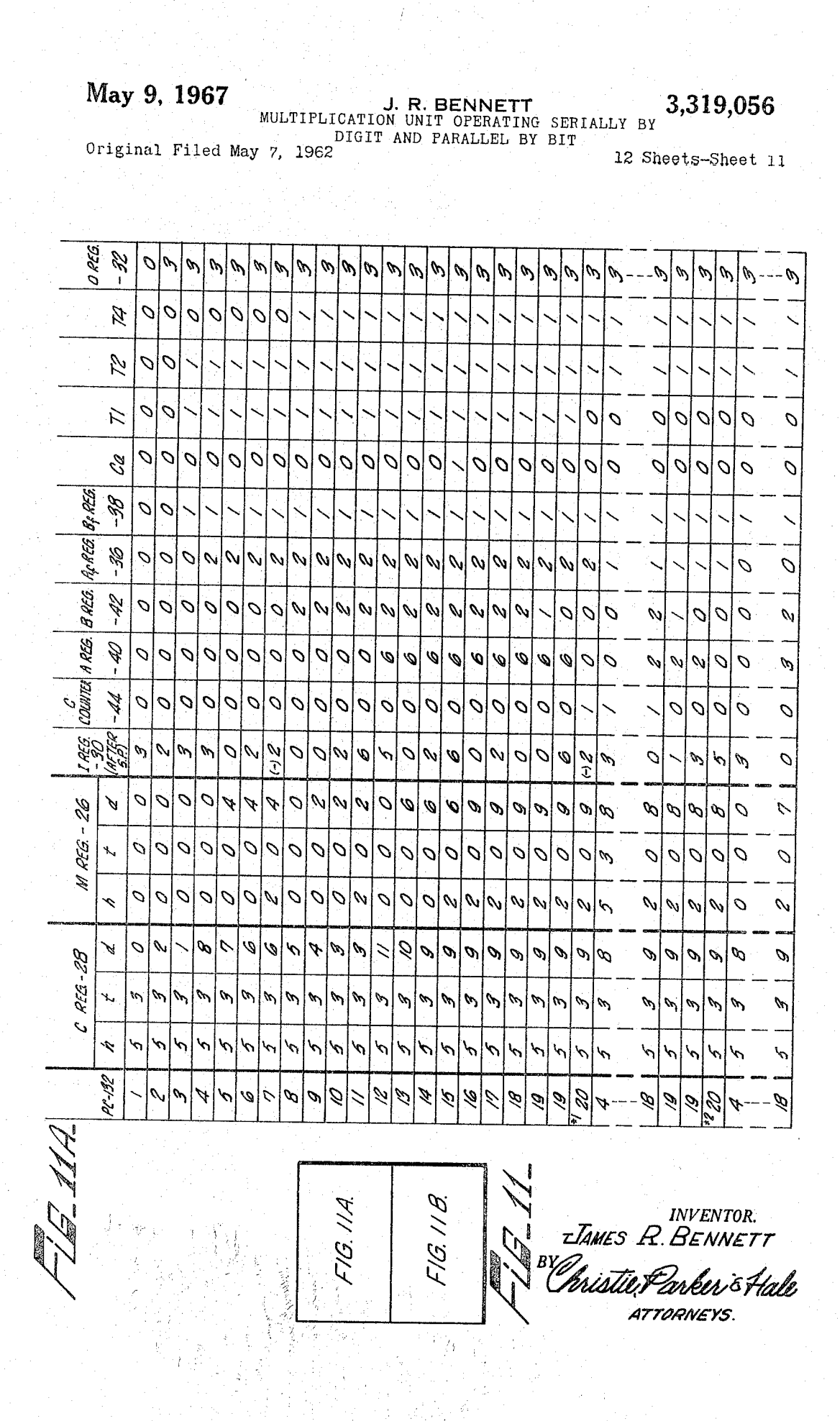
Figure 11B:
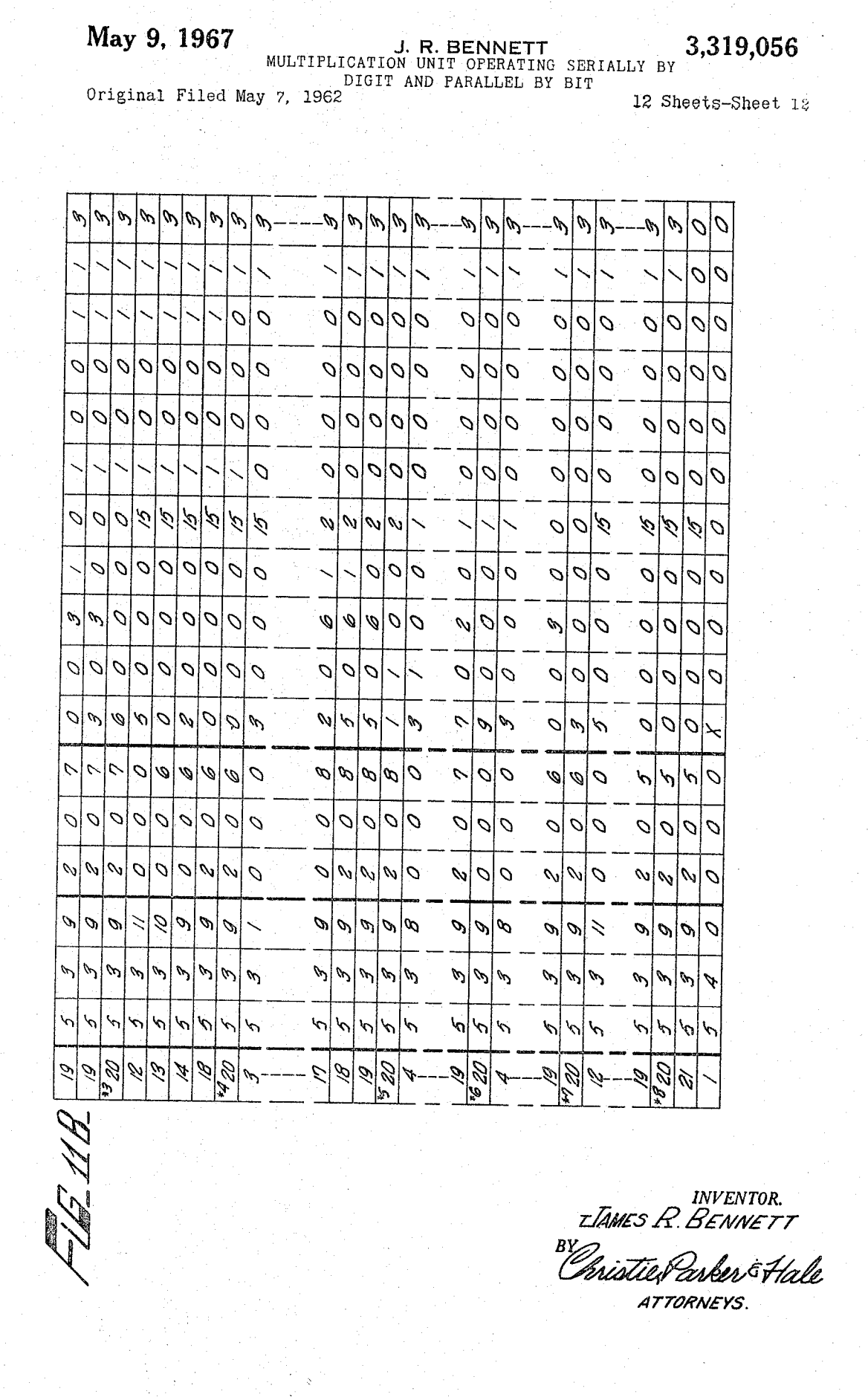

FIGURE 10 is a sketch showing an example of the operands and the storage content of the product field in the memory storage locations specified by the multiplication command word example of FIGURE 9. FIGURE 10 also includes a sketch illustrating the storage content of the product field at indicated time intervals during the execution of the command word example of FIGURE 9; and FIGURE 11, including FIGURES 11A and 11B, is a sketch illustrating the sequence of operation of indicated registers and timing flip-flops in the multiplication unit of FIGURES 2 and 3 while executing the command word example shown in FIGURE 9 on the operands shown in FIGURE 10.

*General description*

FIG. 1 is a pictorial view of an automatic bookkeeping and accounting system for use in a bank. The banking system of FIG. 1 does all the collating, calculating and summarizing for bookkeeping and for updating ledger cards normally accomplished by multiple runs in other automatic banking systems. At the center of the banking system is a digital data processor 10 which is the nerve center or central control and processing unit of the banking system. The processor 10 performs all the editing and computation on data entered into the banking system. At the left of the processor 10 of FIG. 1 is an adding machine type amount encoder 12 which is used by the proof department of a bank to encode or print account numbers and amount numbers on incoming cash letters, checks, and customer deposit slips. All the encoding by the encoder 12 is done in Magnetic Ink Character Recognition coded characters.

The encoded documents from the encoder 12 are put into a high-speed item sorter reader 16. The item sorter reader 16 introduces new digits or characters of data into the processor 10 for editing and processing. The sorter reader 16 also sorts and stores documents in one of 13 pockets provided in the unit.

At the right of the processor 10 in FIG. 1 is a visual record processor 18. The processor 18 processes ledger cards which have visual information printed on the front and coded information written on magnetic stripes on the back side thereof.

A card punch unit 20 is provided at the right of the processor 10 for punching the coded output information from the processor 10 on paper cards. At the left of the processor 10 is a program card reader 22. The program card reader 22 provides the processor 10 with a stored program consisting of commands for sequencing the operation thereof.

Other details of the banking system shown in FIG. 1 are given in a copending patent application entitled, "Data Processing System," assigned to the same assignee as this patent application, bearing the Ser. No. 81,149, and filed on Jan. 6, 1961, issued on Jan. 4, 1966 as Patent No. 3,228,006.

Refer now to FIG. 2. FIG. 2 is a general block diagram of the multiplication unit used in the digital data processor 10 of FIG. 1. Some of the circuits shown in FIG. 2. Assume that the multiplier operand 12 is to be of the processor 10 such as addition and subtraction as described in a copending application entitled, "Digital Data Processor" assigned to the same assignee as this application, bearing the Ser. No. 80,171 and filed on Jan. 3, 1961, now abandoned, a continuation of which issued as Patent No. 3,274,558.

Before considering the actual circuits of the multiplication unit of FIG. 2, consider briefly the sequence of steps of multiplication used by the multiplication unit of FIG. 2. Assume that the multiplier operand 12 is to be multiplied times the multiplicand operand 326.

TABLE I

| | |
|---|---|
| Multiplicand | 326 |
| Multiplier | ×12 |
| First partial product digits | 00652 |
| Second partial product digits | 0326 |
| Final product | 03912 |

TABLE II

| | |
|---|---|
| Multiplicand | 326 |
| Multiplier | ×12 |
| First partial product | 0652 |
| Final product | 03912 |

As indicated in Table I, the grammar school pencil and paper method of multiplying the operands together is accomplished by first taking the low order digit of the multiplier, a digit 2, and multiplying it times each digit of the multiplicand, digits 326, resulting in partial product digits 652. Subsequently, the second digit of the multiplier, a digit 1, is multiplied times each digit of the multiplicand, resulting in another set of partial product digits 326. The two sets of partial product digits are then added together to give the final product 3912.

The steps of multiplication in the multiplication unit of FIG. 2 are quite similar to that outlined in Table I. However, instead of writing or storing the partial products for each multiplier digit separately and later adding the corresponding partial product digits together, the corresponding partial product digit formed during the multiplication by the next lower order multiplier digit is added to each partial product digit as it is determined and the resultant partial product digit is immediately written into a memory.

Table II shows an example of the actual steps of multiplication used by the multiplication unit of FIGS. 1 and 2. As indicated in Table II the multiplier digit 2 is multiplied times the multiplicand 326, giving a partial product of 652 which is written in memory digit by digit as the digits are formed. Subsequently, the multiplier digit 1 is multiplied times each of the multiplicand digits 326. However, in contrast to the pencil and paper method of multiplication shown in Table I, the resulting partial product digits 326 are added, as each is determined, directly to the corresponding partial product digits, in memory, determined during the multiplication by the next lower ordered multiplier digit, resulting directly in the product 3912 which in turn is written in memory digit by digit as the digits are formed.

Refer now to the structure of the command words used in the multiplier unit of FIGS. 2 and 3, as illustrated at the upper part of FIG. 9. It will become evident in the following discussion that the multiplier unit is a variable field length multiplier, multiplying operands having variable numbers of digits or characters. In an actual data processor model incorporating the present invention, each operand has one up to a maximum of twelve digits. However, for the purpose of explaining the invention it is assumed that operands have a maximum of nine digits. Each multiplier command contains twelve digits or characters. The digits of each multiplier command include an order digit (0), three digits for specifying the address of the most significant digit of the multiplier operand ($a3$, $a2$ and $a1$), three digits for specifying the address of the most significant digit of a product storage field ($c3$, $c2$, and $c1$) and two field length digits ($af$ and $bf$) which are indicative of the length of the multiplicand and multiplier operands.

The multiplication unit of FIG. 2 includes a memory 24 which is arranged with word and digit storage locations. The memory of the actual data processor model has four hundred word storage locations and within each word of storage is twelve digits of storage. In order to simplify the description and for purposes of illustrating the invention, it is assumed that there are only ninety-nine words of storage. The ninety-nine words of storage in the memory 24 are numbered 1 through 99. The twelve digits within each word of storage of the memory 24 are numbered 0 through 11.

As illustrated at the lower part of the sketch of FIG. 9, the command digits 0, $af$, $bf$, $a3$, $a2$, $a1$, $b3$, $b2$, $b1$, $c3$, $c2$, and $c1$ are always stored in the digit storage locations 0 through 11, respectively, of a word of storage in the memory 24. At the middle part of the sketch of FIG. 9 is an example of the command word stored in the memory word storage location 53. As indicated in FIG. 9, the command word stored in the word storage 53 has a digit 3 stored in the order (0) position. An order digit 3 indicates that the command is a multiplier command as opposed to other commands such as addition commands, etc. The address of the most significant digits of the multiplicand operand, the multiplier operand, and the product field are 2–0–0, 2–0–3, and 2–0–5, respectively. The length of the multiplicand and multiplier operands are 3 digits ($af$) and 2 digits ($bf$), respectively. Therefore the most significant digit of the multiplicand operand is stored in digit storage position 0 of word storage 20, the address of the most significant digit of the multiplier is stored in digit storage position 3 of word storage 20 and the address of the most significant digit of the product is to be stored in digit storage 5 of word storage 20. The first and second digits of the multiplier and multiplicand operand addresses are used as the tens and units digits of a word of storage of 12 digits in memory.

Refer now to FIG. 10. FIG. 10 is a sketch showing an example of the storage content of the memory storage locations 2–0–0 through 2–0–9. The symbol X is used to represent a stored decimal digit which is not used during the execution of the multiplier command. As indicated in FIG. 10, the numbering of the digit storage of each word storage, increases from left to right, whereas, the order of magnitude of each operand and the product field increases, from the least significant digit to the most significant digit, proceeding from right to left. Using the command in FIG. 9 the most significant digit of the multiplicand is stored in address 2–0–0 and the multiplicand field is three digits ($af$) long, the multiplicand operand is stored in the address 2–0–0, 2–0–1 and 2–0–2. Therefore, the multiplicand operand is a decimal number 326. Similarly, the most significant digit of the multiplier is stored in the memory address 2–0–3 and the multiplier operand is two digits ($bf$) long. Therefore, the multiplier operand is stored in the addresses 2–0–3 and 2–0–4 and is a decimal number 12. To be explained in detail, the symbol (–) in front of the number 2 indicates the multiplier operand 12 is negative. The product field begins with address 2–0–5 and the length thereof, is equal to the sum of the two multiplicand and multiplier field length digits (5 digits long). Thus, the product field includes the address 2–0–5 through 2–0–9.

The method of deriving the address of the least significant digit of operands and product fields is important in understanding the operation of the multiplication unit of FIGS. 2 and 3. In order to obtain the address of the least significant digit of the multiplier and multiplicand operands, the address of the most significant digit thereof must be added to the corresponding field length digit minus one unit. Thus, in the example of FIG. 9, the address of the least significant digit of the multiplicand is equal to 2–0–0 plus 3 ($af$) minus 1 or 2–0–2. Referring now to FIG. 10 it will be noted that the address 2–0–2 is the address of the least significant digit of the multiplicand operand. The address of the least significant digit of the product field is derived by adding the address of the most significant digit of the product field to the multiplier field length digit ($bf$) minus one, plus the multiplicand field length digit ($af$) minus one, plus one unit. For example, the address of the least significant digit of the product field for the example of FIG. 9 is equal to 2–0–5, plus 2 minus 1, plus 3 minus 1, plus 1 or 2–0–9. As indicated in FIG. 10, 2–0–9 is the address of the least significant digit of the product field.

The above-mentioned data processor model is arranged with seven bits in each operand and command digit. However, in order to simplify the description of the invention, two of the bits may be neglected and it is assumed, for purposes of explanation, that these digits only have five bits. FIG. 6 shows an example of the structure of the operand and product digits. As indicated in FIG. 6, the first bit is represented by the symbol B and is a sign bit. The other four bits are numbered in the 8–4–2–1 number code and form the numeric portion of the operand and product digits. FIG. 7 shows an example of the structure of the command digits. As indicated, the first digit is again represented by the symbol B, however, bit B of command digits is only included, for purposes of illustrating the invention, in order to keep all digits with the same number of bits. However, in the actual data processing machine this bit is used. The remaining four bits of the command digits are also numbered in the 8–4–2–1 number code and form the numeric portion of the digit.

Refer now to the general block diagram of the multiplier unit shown in FIG. 2. The memory 24 of the multiplier unit is addressed by a command register 28 and a memory register 26, hereinafter referred to as the C reg.–28 and M reg.–26. The C reg.–28 is used for fetching the commands or for addressing the digits of each command stored in the memory 24, whereas the M reg.–26 is used for addressing digit storage locations of the operand and product fields in the memory 24. Information is read out of the addressed storage locations of the memory 24 a digit at a time. Each digit read out of and to be written into the memory 24 is stored in an information register 30, hereinafter referred to as the I reg.–30. When a command is to be fetched and executed, the C reg.–28 first addresses the order digit (0) of the command. The addressed order digit is read out of the memory 24 into the I reg.–30 and then stored in an order register 32, hereinafter referred to as the O reg.–32. If the order digit is a digit 3 a multiplication cycle of operation is commenced.

The field length digits ($af$ and $bf$) of the same command are then sequentially addressed by the C reg.–28 and read out of the memory 24 into the I reg.–30 one after the other. As the field length digits ($af$ and $bf$) are read out of the memory 24 into the I reg.–30 an adder circuit 34 subtracts one unit from the magnitude of each one. The modified multiplicand and multiplier field length digits ($af$ minus one and $bf$ minus one) are then stored in two field length registers 36 and 38, respectively, hereinafter referred to as the $A_f$ reg.–36 and the B reg.–38. Subsequently, the C reg.–28 addresses the three digits of the address of the most significant digit of the multiplier ($b3$, $b2$ and $b1$) of the same command which are read out of the memory 24 and into the I reg.–30, a digit at a time. As the three digits ($b3$, $b2$ and $b1$) of the multiplier address are read out of the memory 24, the adder circuit 34 adds the modified multiplier field length digit ($bf$ minus one), thereto and the sultant modified multiplier address ($b3$, $b2$, $b1$ plus $f$ minus one) is stored in the M reg.–26.

As discussed hereinabove, the preceding addition formed the address of the least significant digit of the multiplier operand. The M reg.–26 now addresses the memory 24 causing the least significant digit of the multiplier operand to be read out and stored in a multiplier register 42, hereinafter referred to as the B reg.–42.

The C reg.–28 now addresses the three digits of the address of the most significant digit of the multiplicand ($a3$, $a2$ and $a1$) of the same command. The multiplicand address digits ($a3$, $a2$ and $a1$) are serially read out of the memory 24 and the adder circuit 34 adds the modified multiplicand field length digit ($af$ minus one) thereto, thereby forming the address of the least significant digit of the multiplicand operand ($a3$, $a2$ and $a1$, plus $af$ minus one). The address of the least significant digit of the multiplicand operand is then stored in the M reg.–26. The M reg.–26 then addresses the least significant digit of the multiplicand operand, causing it to be read out of the memory 24 into the I reg.–30 and finally to be stored in a multiplicand register 40, hereinafter referred to as the A reg.–40.

With the least significant multiplier and multiplicand operand digits stored in the A and B regs.–40 and –42, the C reg.–28 addresses the three digits of the address of the most significant digit of the product field ($c3$, $c2$, and $c1$) of the same command, causing the digits to be read out of the memory 24 a digit at a time. As the product field address digits ($c3$, $c2$ and $c1$) are read out of the memory 24, the adder circuit 34 adds the modified multiplier field length digit ($bf$ minus one) thereto and the resultant address ($c3$, $c2$, $c1$ plus $bf$ minus one) is stored in the M reg.–26. The adder circuit then automatically adds the modified product address stored in the M reg.–26 to the modified multiplicand field length digit ($af$ minus one) and simultaneously adds one extra unit to the address. As discussed hereinabove, the resulting product address ($c3$, $c2$, $c1$, plus $bf$ minus one, plus $af$ minus one, plus one) is that of the least significant digit of the product field. The resultant address of the least significant digit of the product field is stored in the M reg.–26.

The adder 34 now adds the multiplicand to itself the number of times indicated by the magnitude of the multiplier digit stored in the B reg.–42 and the resultant partial product digit is stored in the I reg.–30. The M reg.–26 then addresses the memory 24 with the address for storage of the least significant digit of the product field and the partial product digit stored in the I reg.–30 is written in the memory 24 in the least significant digit storage location.

A carry counter 44, hereinafter referred to as the C counter–44, keeps track of any carries formed by the adder 34 during the multiplication operation. To be explained in detail hereinbelow, the carry stored in the C counter–44 is subsequently added to the next higher order partial product digit formed.

After storing the first partial product digit, the modified multiplicand field length digit ($af$ minus one), stored in the $A_f$ reg.–36, is decreased by one additional unit (resulting in a modified field length digit of $af$ minus two). The above cycle of operation is now repeated, beginning with reading out the beginning operand addresses ($b3$, $b2$, $b1$ and $a3$, $a2$, $a1$). The beginning operand addresses ($b3$, $b2$, $b1$ and $a3$, $a2$, $a1$) are again added to the corresponding modified field length digits stored in the $B_f$ and the $A_f$ regs.–36 and –38. This results in a multiplicand address of the next to the least significant digit of the multiplicand operand ($a3$, $a2$, $a1$ plus $af$ minus two). Thus, the next to the least significant digit of the multiplicand operand is addressed, read out of the memory 24, and stored in the A reg.–40. However, since the modified multiplier field length digit ($bf$ minus one) is the same, the address of the least significant digit of the multiplier operand ($b3$, $b2$, $b1$ minus one) is again formed, causing the least significant digit of the multiplier operand to be read out of the memory 24 and stored in the B reg.–42. The next to the least significant digit of the multiplicand operand is then added to itself the number of times indicated by the magnitude of the least significant multiplier digit. At the same time any carry, as indicated by the storage content of the C counter–44, is added into the partial product digit. The new partial product digit is then written in the memory 24. However, it should be noted that the new partial product digit is written into the next to the least significant position of the product storage field.

The above operation is repeated for each multiplicand digit. When each of the multiplicand digits have been multiplied, a new multiplier digit is brought out and multiplied times each of the multiplicand digits as outlined above.

The sequence of operation of the multiplier unit for integrating the partial product digits formed during the multiplication by the least significant multiplier digit should be noted. The digits of the multiplicand operand are sequentially read out of the memory 24 and stored in the A reg.–40. Also, the next to the least significant digit of the multiplier operand is read out of the memory 24 and stored in the B reg.–42 each time a new multiplicand digit is read out of the memory 24.

The partial product digits formed during the multiplication of multiplier operand digits, including the next to the least significant multiplier operand digit and higher order multiplier digits must be combined with the partial product digits previously formed and written in the memory 24. For example, the partial product digits formed during the multiplication of the least significant multiplier digit are arranged and stored in the memory 24 in accordance with the order of significance of the digits. The partial product digits being formed during the multiplication of the next to the least significant multiplier digit must be added to the corresponding partial product digit formed during the multiplication of the least significant multiplier digit. See Table II wherein the partial product digit 6 is added to the partial product digit 5 to form the partial product digit 1 with a carry of 1. To this end, the multiplier unit of FIG. 2 automatically reads out the corresponding partial product digit formed during the multiplication of the least significant multiplier digit and stores the digit in the I reg.–30. Any carry from a previous multiplicand, indicated by the state of the C counter–44, is added to the partial product digit stored in the I reg.–30. This is done before the actual steps of multiplication are commenced. The actual steps of multiplication are then commenced wherein the multiplicand operand digit stored in the A reg.–40 is added to the contents of the I reg.–30 the number of times indicated by the magnitude of the next to the least significant multiplier digit stored in the B reg.–42. When the multiplication of a multiplicand digit is completed, the resultant partial product digit in the sum of the partial product digit resulting from multiplying the multiplier and multiplicand operands, the partial product digit read out of the memory 24 and any carry, and is stored in the I reg.–30. The resultant partial product digit is then written in the memory 24 in the same position of the product field as the partial product digit read out of the memory 24 and stored in the I register–30.

The multiplication of the other digits of the multiplier operand and adding in the corresponding previously formed partial product digits is performed in a similar manner. Details of the circuits for performing the multiplication are explained hereinbelow in the sections dealing with the detailed description of the circuits and operation.

*Detailed description of circuits*

With the general block diagram of FIGURE 2 in mind, refer now to the detailed block diagram of the multiplier shown in FIGURE 3.

Before considering the other circuits of the multiplier of FIGURE 3, it should be noted that a timing generator 45 is provided for sequencing the operation of the various gates, registers and flip-flop circuits of FIGURE 3. One circuit of importance to each of the other circuits of FIGURE 3 is a clock pulse generator 47 shown in dashed lines within the timing generator 45. Clock pulses developed by the generator 47 are applied to each of the registers, flip-flop circuits, counters and the control for memory 24 of FIGURE 3 as well as timing flip-flops within the generator 45. The clock pulses synchronize the change in state of each of these circuits unless otherwise specified.

Flip-flop circuits have two stable states of operation. These stable states will be referred to hereinafter as the "1" and "0" states. Flip-flops also have two inputs for controlling the states into which a clock pulse causes them to be set. Throughout the following discussion a control signal is referred to as the necessary signal for controlling the triggering of the flip-flops. Control signals at "set" and "reset" inputs of the flip-flops cause them to be triggered into "1" and "0" states by clock pulses. A control signal at both the "set" and "reset" circuits of a flip-flop cause it to reliably change states at the occurrence of a clock pulse.

*Memory 24*

The memory 24 is a coincident current magnetic core memory unit. The addressing lines for the memory 24 are connected to the gates 46 and 48. The input and output information circuits of the memory 24 are connected to gates 50 and 52 respectively. The coincident current magnetic core memory 24, as already pointed out in the general description has ninety-nine work storage locations and within each word of storage, twelve digits of storage. Each digit storage location has storage for five bits of information.

A memory timing generator 54 is connected to the input of the memory 24. The memory timing generator 54 has three output circuits at which output pulses are developed in response to clock pulses. FIGURE 5 shows the sequence with which pulses are developed by the memory timing generator 54 and their relative pulse lengths. Each time a clock pulse is developed the generator 54 develops a read pulse (RP). During the read pulse, a short strobe pulse (SP) is developed. After the read pulse (RP) and strobe pulse (SP) a write pulse (WP) is developed. The generator 54 may be a conventional timing generator using delay lines or a time pulse distributor using gating circuits such as that described beginning on page 307 of the book entitled Digital Computer Fundamentals by Thomas C. Bartee, published by the McGraw-Hill Book Company, Inc., 1960.

The output circuits of the generator 54 at which the read pulse (RP) and write pulse (WP) are developed, are connected to the coincident current core memory 24. The output at which strobe pulse (SP) is developed, is connected to the input of the I reg.–30.

The memory 24 is responsive to the read pulse (RP) for reading out the binary bits in parallel, representing a digit stored in the storage location addressed by signals from either the gate 46 or the gate 48. Each group of signals read out of memory 24 is applied to the input of the gate 52 in parallel. The gate 52 is responsive to a control signal on a read memory line 52a for coupling the digit of signals at the input thereof to the input of the I reg.–30 in parallel for storage therein.

The memory 24 is also responsive to a write pulse (WP) developed by the generator 54 for writing a digit of signals applied at the input thereof by the gate 50. The digit is written in the digit storage location specified by address signals from either the gate 46 or the gate 48. The gate 50 is responsive to a control signal on a write memory line 50a for coupling the output of the I reg.–30 to the input of the memory 24 for allowing the digit stored therein to be written in the memory 24. Coincident current magnetic core memories are well known in the computer art, therefore, other details of the memory 24 will not be given other than making reference to chapter 8, entitled Magnetic Core Storage in the book entitled Digital Computer Components and Circuits by R. K. Richards published by D. Van Nostrand Company, Inc., in February 1958.

*I register–30*

The I reg.–30 is the input and output information register of the memory 24. Each digit to be written in the memory 24 is first stored in the I reg.–30. Also, each digit read out of the memory 24 is stored in the I reg.–30 before being transferred to other circuits in the multiplication unit of FIGURE 3.

The I reg.–30 has five flip-flop circuits. The five flip-flops of the I reg.–30 are represented by the symbols IB, I8, I4, I2 and I1. The flip-flop IB is a sign flip-flop for storing a signal indicative of the sign of the digit stored in the I reg.–30. The flip-flops I8, I4, I2, and I1 form the numeric portion of the I reg.–30 and store the numeric portion of digits. The numbers assigned to the flip-flops of the numeric portion of the I reg.–30 are coded in 8–4–2–1 number code. The numeric flop-flops in a "1" state indicate the magnitude of the digit stored in the register. Thus, if I4 and I1 are in a "1" state the I reg.–30 is storing a digit 5. When the IB register is in "1" and "0" states the I register is storing negative and positive digits, respectively.

In addition to the connection to the gates 52 and 50 the I register–30 has its output circuit connected to gates 61, 63, 64, 65, 66 and 68 and its input circuit connected to gates 62, 120, 122 and 124. The I reg.–30 also has control lines 30a, 30b and the SP output circuit of the memory timing generator 54 connected thereto.

The gate 62 has its input circuit connected to the output of the adder 34. The gate 62 is responsive to a control signal on a control line 62a for coupling the output of the adder 34 to the input of the I reg.–30 in parallel.

To be explained in the section dealing with the timing generator 45, the computer 10 steps through a series of states in executing each command including the multiplication command. The timing generator 45 has output circuits corresponding to these states designated PC–1 through PC–21. The gates 120, 122 and 124 have control lines connected to the PC–16, PC–15 and PC–14 output lines of the timing generator 45.

A clock pulse in coincidence with signals applied to the I reg.–30 by the gates 62, 120, 122 and 124 cause the signals to be stored in the flip-flops of the I reg.–30.

Similarly, the gate 52 provides signals to the I reg.–30. However, in contrast to the signals from the gate 62 which are read in synchronism with clock pulses the signals from the gate 52 are stored in the flip-flops of the I reg.–30 in response to a strobe pulse (SP) from the generator 54.

A signal on the line 30a referred to hereinafter as the set $I=0$ line 30a in coincidence with a clock pulse causes each of the flip-flops in the I reg.–30 to be set to a "0" state. A signal on the line 30b, hereinafter referred to as the set Ib line 30b, in coincidence with a clock pulse sets the IB flip-flop into a "1" state.

The gates 61 and 63 have a single line output circuit at which a control signal is developed whenever the flip-flops of the I reg.–30 are in states representing digits 3 and 0 respectively.

*0 Register–32*

The gate 65 has a control input circuit connected to the PC–1 output circuit of the timing generator 45. The 0 reg.–32 has its input circuit connected to the output circuit of the gate 65. A control signal at the PC–1 output circuit of generator 45 causes the gate 65 to couple the output of the I reg.–30 to the input of the 0 reg.–65, which stores the digit of signals in parallel stored in the I reg.–30 at the occurrence of the next clock pulse.

A register—40

The A reg.–40 has four flip-flops represented by the symbols A8, A4, A2 and A1, which are number coded in the 8–4–2–1 number code as the I reg.–30. The A reg.–40 has information input and output circuits connected to the gate 64 and a gate 70, respectively. The A reg.–40 also has an input control circuit connected to a set $A=0$ line 40a.

The gate 64 has its control circuit connected to the PC–11 output circuit of the timing generator 45. A control signal at the PC–11 output circuit of the generator 45 causes the gate 64 to couple the output circuit of the I reg.–30 to the input circuit of the A reg.–40. The digit of signals stored in the I reg.–30 is stored in the A reg.–30 at the occurrence of a clock pulse when a control signal is applied to gate 64. Gating circuits (not shown) of the A reg.–40 are also provided and are responsive to a signal on the set $A=0$ line 40a in coincidence with a clock pulse for resetting each of the flip-flops thereof into a "0" state.

B register—42

The B reg.–42 has four flip-flops designated B8, B4, B2, and B1 similar to the A reg.–40. The flip-flops of the B reg.–42 are also number coded in the 8–4–2–1 number code similar to the I reg.–30. The gate 68 has an output circuit connected to the input of the B reg.–42. The B reg.–42 has an output circuit connected to the input of two gates 74 and 76.

The gate 68 has a control line connected to the PC–7 output line of the generator 45. The gate 68 causes the numeric portion of the digit stored in the I reg.–30 to be stored in the B reg.–42 whenever a control signal is applied on the control line thereof in coincidence with a clock pulse.

Gating circuits (not shown) of the B reg.–42 are responsive to a control signal on a count −1 line 42a in coincidence with a clock pulse for causing the B reg.–42 to operate as a counter and count the magnitude of the digit stored therein down one unit.

Refer now to the gates 74 and 76. The gate 74 is responsive to the state of the B reg.–42, wherein each of the flip-flops therein are in a "0" state for developing a control signal at an output line represented by the symbol $B=0$. The signal circuit 76, in contrast to the signal circuit 74, is responsive to a non "0" state of any one of the flip-flops of the B register–42 for developing a control signal at an output line represented by the symbol $B=0$.

Adder 34

The adder 34 has two digit information input circuits designated as the "X" and the "Y" inputs. The "X" information input circuit of the adder 34 is connected to the output of the gate 66. The "Y" information input circuit is connected to the output of the gate 70 and gates 80, 82, 84 and 86. The adder 34 also has a numeric output circuit connected to the input of gates 88, 90, 92, 94, 96 and the gate 62.

The "X" input circuit of the adder 34 has four input circuits represented by the symbols X8, X4, X2, X1 also numbered in the 8–4–2–1 number code. Similarly, the "Y" input circuit and the "Z" output circuit of the adder 34 have four circuits represented by the symbols Y8, Y4, Y2, Y1 and Z8, Z4, Z2, Z1 and numbered in the 8–4–2–1 number code. Whenever a control signal is applied on a control line 66a of the gate 66, an output circuit of the correspondingly numbered flip-flops of the I reg.–30 are coupled to the input circuits X8, X4, X2, X1. Similarly, whenever control signals are applied to the PC–19 and PC–18 output lines of the generator 45, correspondingly numbered flip-flops of the A reg.–40 and the C counter 44, respectively, are coupled to the input circuits Y8, Y4, Y2, Y1. Alos, a control signal applied to the gates 84 and 86 cause correspondingly numbered flip-flops of the $B_f$ reg.–38 and the $A_f$ reg.–36, respectively, to be coupled to the input circuits Y8, Y4, Y2, Y1 of the adder 34.

The adder circuit 34 also has a carry input line connected to the output circuit of a carry flip-flop represented by the symbol $Ca$. The adder circuit 34 also has two output lines represented by the symbols CL and CL' for indicating a carry-out from any addition performed thereby. The output lines CL and CL' are connected to an input circuit of the timing generator 45.

The adder 34 has gating circuits (not shown) for adding decimal coded signals together applied at the "X" and "Y" input circuits and for generating output signals at the Z8, Z4, Z2, Z1 output circuits which represent the decimal sum. The adder 34 develops a control signal on the CL line whenever the sum of the numbers represented by the decimal coded signals applied at the "X" and "Y" input circuits is greater than 9, thereby indicating a carry out. A control signal is developed on the CL' line of the adder 34 whenever the sum of the numbers represented by the coded signals applied at the "X" and "Y" input circuits is equal to or less than 9, thereby, indicating no carry out.

The adder 34 is arranged in response to the "1" state of the carry flip-flop $Ca$ for adding one extra decimal digit into the sum of the numbers represented by the coded signals applied at the "X" and "Y" inputs of the adder 34.

The adder is a conventional full decimal adder for signals coded in the 8–4–2–1 number code such as the one shown and described starting on page 210 of the book entitled, Arithmetic Operations in Digital Computers by R. K. Richards, published by D. Van Nostrand Company, Inc., in 1955.

The generator 45 has gating circuitry for selectively setting the $Ca$ flip-flop into a "1" state in response to a control signal on the CL line of the adder 34. Details of the gate of the generator 45 for controlling the setting of the $Ca$ flip-flop to a "1" state will be described in detail in connection with the description of the timing generator 45. The reset input circuit of the $Ca$ flip-flop for setting it into a "0" state is connected to the CP output circuit of the timing generator 45.

The input of the gate 80 is connected to the output circuit of a radix −1 circuit 98. The circuit 98 is called the radix −1 circuit to indicate that it continuously develops a four bit output signal representing the radix of the decimal number system minus one or nine. When a control signal is applied on a control line 80a of the gate 80 the output of the radix −1 circuit 98 is coupled to the "Y" input of the adder 34.

The operation of the adder 34 when the radix −1 circuit 98 is coupled to the "Y" input can best be illustrated by an example. Consider the operation of the adder 34 when signals representing decimal digits are applied to the "X" input. The sum of 9 and 1 is 0 with a carry out. Thus, the adder 34 develops signals representing decimal numeric digit 0 with a carry or control signal on the CL line. Thus, by ignoring the carry signal the adder 34 has subtracted 1 from 1 leaving 0 as the remainder at the numeric output of the adder 34.

C counter—44

The C counter–44 is provided for keeping track of the carry signals developed by the added 34 during the multiplication of each of the multiplier and multiplicand digits. The C counter–44 has an output circuit connected to the input of the gate 82.

The C counter–44 has four flip-flop circuits represented by the symbols CC8, CC4, CC2, and CC1, and numbered in the 8–4–2–1 number code as the I reg.–30.

The C counter–44 has gating circuits (not shown) which are responsive to a signal on a set=0 line 44a in coincidence with a clock pulse for setting each of the flip-flops thereof into a "0" state. The C counter–44 is also responsive to a signal on a set=1 line 44b in coincidence with a clock pulse for setting the CC1 flip-flop into a "1" state and each of the other flip-flops into a "0" state. Additionally, the gates of the C counter–44 are responsive to a signal on a count +1 line 44c in coincidence with each clock pulse for counting and increasing the state of the carry counter one decimal unit.

$A_f$ and $B_f$ field length registers–36 and 38

The $A_f$ reg.–36 has an input circuit connected to the output of the gate 90. The output circuit of the $A_f$ reg.–36 is connected to the input circuit of the gate 86 and the input circuits of gates 108, 110, 112, and 114.

The $A_f$ reg.–36 has four flip-flop circuits represented by the symbols $A_f8$, $A_f4$, $A_f2$, and $A_f1$, also numbered in the 8–4–2–1 number code as the I reg.–30. Whenever the gate 90 receives a control signal on the PC–3 output line of the generator 45 the numeric output circuit of the adder 34 is coupled to the input of the $A_f$ reg.–36. The following clock pulse causes the coded output signals of the adder 34 to be stored in the flip-flops of the $A_f$ reg.–36.

Gating circuits (not shown) are also provided in the $A_f$ reg.–36, and are responsive to a signal on a set=0 line 36a for triggering each of the flip-flops thereof into a "0" state at the occurrence of a clock pulse. The gating circuits of the $A_f$ reg.–36 are also responsive to a signal on a set=15 line 36b in coincidence with a clock pulse for triggering each of the flip-flops thereof into a "1" state, thereby causing the $A_f$ reg.–36 to represent a decimal number 15. A signal on a count line 36c in coincidence with a clock pulse causes the state of the $A_f$ reg.–36 to count down one state and thereby reduce the stored digit one decimal unit. When the $A_f$ reg.–36 is in state "0" and a count signal is applied on the count line 111, the register is set to represent a decimal number 15.

The $B_f$ reg.–38 is similar to the $A_f$ reg.–36 and has four flip-flops represented by the symbols $B_f8$, $B_f4$, $B_f2$ and $B_f1$. The $B_f$ reg.–38 has an input circuit connected to the output circuit of the gate 88. The output circuit of the $B_f$ reg.–38 is connected to the input circuit of the gate 84 and the input circuits of gates 116 and 118.

The signals developed at the numeric output circuit of the adder 34 are coupled to and stored in the $B_f$ reg.–38 by the gate 88 at the occurrence of a clock pulse whenever a control signal is developed on the PC–2 output line of the generator 45. Gating circuits (not shown) of the $B_f$ reg.–38 are also responsive to a signal on a set=0 line in coincidence with a clock pulse for triggering each of the flip-flop circuits thereof into a "0" state. The set=0 line is connected to the PC–21 output circuit of the generator 45. A signal on a count −1 line 38a in coincidence with a clock pulse causes the gating circuits of the $B_f$ reg.–38 to count the register down one state and reduce the digit stored therein one decimal unit.

The gating circuits 108, 110, 112, 114, 116 and 118 are arranged for developing a control signal indicative of certain states of the registers 36 and 38. The gating circuit 108 develops a control signal whenever the $A_f$ reg.–36 is storing a digit zero (all of the flip-flops in the $A_f$ reg.–36 are in a "0" state). The gating circuit 110 develops a control signal whenever the $A_f$ reg.–36 is not storing a digit zero (one or more of the flip-flops of the $A_f$ reg.–36 is in a "1" state). The gating circuit 112 develops a control signal whenever a decimal number 15 is stored therein (all of the flip-flops of the $A_f$ reg.–36 are in a "1" state). The gating circuit 114 develops a control signal whenever the $A_f$ reg.–36 is not storing a decimal number 15. The gating circuit 116 develops a control signal whenever a digit zero is stored in the $B_f$ reg.–38 (all of the flip-flops of the $B_f$ reg.–38 are in a "0" state). The gate 118 develops a control signal whenever the $B_f$ reg.–38 is not storing a digit zero (one or more of the flip-flops of the $B_f$ reg.–38 are in a "1" state).

M register–26

The M reg.–26 has three sections designated; the hundreds $(h)$ sections, the tens $(t)$ section, and the digits $(d)$ section. Each of the three sections of the M reg.–26 have four flip-flops which, similar to the I reg.–30, are numbered in the 8–4–2–1 number code. The hundreds $(h)$ section of the M reg.–26 has an input circuit connected to the output of the gate 96 and an output circuit connected to an input circuit of the gate 120. Similar to the hundreds $(h)$ section, the tens $(t)$ section has an input circuit connected to the output circuit of the gate 94 and an output circuit connected to the input circuit of the gate 122. The digits $(d)$ section of the M reg.–26 has an input circuit connected to an output circuit of the gate 92 and an output circuit connected to the input of the gate 124.

The gates 96, 94 and 92 are responsive to control signals on control lines 96a, 94a and 92a, respectively, for storing the output signal developed at the numeric output circuit of the adder 34 in the hundreds, tens, and digits sections, respectively, of the M reg.–26.

Gating circuits (not shown) of the M reg.–26 are responsive to a control signal on a set=0 line, connected to the PC–21 output circuit of the generator 45, in coincidence with a clock pulse for automatically setting all of the flip-flops thereof into a "0" state.

The gate 46 couples the outputs of all of the sections of the M reg.–26 to the addressing circuits of the memory 24 in response to a control signal on a control line 46a.

C register–28

Similar to the M reg.–26, the C reg.–28 is arranged in three sections, referred to as the hundreds $(h)$, the tens $(t)$, and the digits $(d)$ sections. The output of all of the three sections of the C reg.–28 are connected to the input of the gate 48. A signal on a control line 48a of the gate 48 causes the gate 48 to couple the outputs of the C reg.–28 to the addressing circuits of the memory 24.

To be explained in the following discussion, the hundreds $(h)$ and the tens $(t)$ sections of the M reg.–26 and the C reg.–28 address the word storage locations in the memory 24. The digits $(d)$ section of the M reg.–26 and the C reg.–28 address the digit storage locations within each word storage location.

The C reg.–28 contains gating circuits (not shown) which are responsive to a signal on the count line for advancing the hundreds $(h)$ and tens $(t)$ sections of the C reg.–28 one decimal digit. The hundreds $(h)$ and tens $(t)$ sections of the C reg.–28 are arranged to count in the decimal number system and have 100 possible states. The states of the hundreds $(h)$ and tens $(t)$ sections of the C. reg.–28 are referred to as states 0 through 99. A signal on the PC–21 output line of generator 45 in coincidence with a clock pulse, causes the hundreds $(h)$ and the tens $(t)$ sections of the C reg.–28 to count up one decimal unit.

Set lines represented by the general symbol 130 are provided for controlling the states of the digits section of the C reg.–28. For purposes of explanation of the multiplication unit, it is assumed that the digits section of the C reg.–28 has twelve possible states of operation, referred to as states 0 through 11. The set lines 130 are shown in FIGURE 4–V and as indicated, there is a set line for each of the states 0 through 11 of the digits $(d)$ section of the C reg.–28. A control signal on a set line causes the digits section to be set to the correspondingly numbered state.

Timing Generator 45

The timing generator 45 contains the gating circuits, counters, and timing flip-flops which are not otherwise shown for controlling and sequencing the operation of the multiplication unit of FIGURE 3. The circuits of the timing generator 45 are shown in FIGURES 4–A through 4–Y.

Refer first, to the program counter 132, shown in the FIGURE 4–A. The program counter 132 has twenty-one unique states of operation, referred to as states "1" through "21," and corresponding thereto twenty-one output circuits, connected to the output lines PC–1 through PC-21 referred to hereinabove. When the counter 132 is in a particular state, a control signal is developed on the correspondingly numbered output line.

In the actual model of the digital computer, the program counter 132 is composed of a number of control flip-flops and gating circuits. However, for purposes of illustration and in order to simplify the explanation of the operation, the program counter 132 is shown having counters 134, 135, 136, 137, 138, 139 and 140. Each of the counters of the program counter 132 have a "0" state. In addition, the counter 134 has a state "1"; the counter 135 has states "2" through "7"; the counter 136 has states "8" through "14"; the counter 137 has states "15" through "18"; the counter 138 has a state "19"; the counter 139 has a state "20"; and the coutner 140 has a state "21." The output circuits PC-1 through PC-21 are connected to the outputs of the counters 134 through 140 having the correspondingly numbered states. Additionally, the counters of the program counter 132 have "set" circuits which are responsive to an applied control signal for setting the counters from state "0" into the designated state. Once a counter of the program counter 132 is in a state other than state "0" the succeeding clock pulses cause the counters to count through the increasingly numbered states. When a counter is in its highest numbered state, the next clock pulse causes it to count back to state "0," where it remains until another set control signal is received. All of the counters 134, 135, 136, 137, 138, 139 and 140, except one, are in a "0" state during operation.

The counter 134 has a set=1 circuit connected to the PC-21 output circuit of the program counter 132.

The counter 135 has three set circuits referred to as set=2, set=3 and set=4 circuits and are connected to the output circuits of "and" gates 142, 144 and 146, respectively.

The "and" gate 142 has input circuits connected to the PC-1 output circuit of the program counter 132 and the $I=3$ output circuit of the gate 61 (see FIGURE 3). The "and" gate 144 has input circuits connected to the PC-20, the $A_f=15$ and the $B_f \neq 0$ output circuits of the program counter 132, and the gates 112 and 118 (see FIGURE 3). The "and" gate 146 has its input circuits connected to the PC-20, the $A_f \neq 0$ and the $A_f \neq 15$ output circuits (see FIGURE 3).

The counter 136 has two set circuits called set=8 and set=12 input circuits and are connected to the output circuits of an "and" gate 148 and an "or" gate 150.

The input circuits of the "and" gate 148 are connected to the PC-7 output circuit of the counter 132 and an output circuit of a signal inverter circuit 152. The input circuit of the inverter circuit 152 is connected to the output circuit of an "and" gate 154. The input circuits of the "or" gate 150 are connected to the output circuit of the "and" gate 154 and another "and" gate 156. The "and" gate 154 has its input circuits connected to the PC-7, $T_1'$, and $I=0$, output circuits of the program counter 132, a timing flip-flop $T_1'$ (see FIGURE 4-W) and gate 63 (see FIGURE 3). The "and" gate 156 has its input circuits connected to the PC-20 and $A_f=0$ (see FIGURE 3) output circuits.

The counter 137 has input circuits referred to as set=15 and set=18 circuits connected to the output circuits of "and" gates 158 and 160. The "and" gate 158 has its input circuits connected to the PC-14 and the $A_f \neq 15$ (see FIGURE 3) output circuits. The "and" gate 160 has its input circuits connected to the PC-14 and $A_f=15$ (see FIGURE 3) output circuits.

The counter 138 has a control circuit referred to as a set=19 input circuit connected to an "or" gate 162. The "or" gate 162 has input circuits connected to "and" gates 164 and 166. The "and" gate 164 has its input circuits connected to the PC-18 and $B \neq 0$ (see FIGURE 3) output circuits. The "and" gate 166 has its input circuits connected to the $B \neq 0$ (see FIGURE 3) and PC-19 output put circuits. The counter 139 has a set=20 circuit connected to an "or" gate 168. The "or" gate 168 has its input circuits connected to "and" gates 170 and 172. The "and" gate 170 has its input circuits connected to the PC-19 and the $B=0$ (see FIGURE 3) output circuits. The inputs of the "and" gate 172 are connected to the PC-18 and $B=0$ output circuits.

The counter 140 has a set=21 input circuit connected to an "and" gate 174. The "and" gate 174 has its input circuits connected to the PC-20, $A_f=15$, and $B_f=0$ (see FIGURE 3) output circuits.

Refer now to FIGURES 4-B, 4-C and 4-D which show the gates of the timing generator 45 for developing control signals for the gates 50, 46 and 48 of FIGURE 3. The write memory line 50a to the gate 50 of FIGURE 4-B is connected to a signal inverter 176. The inverter 176 is connected to an "or" gate 178. The "or" gate 178 has input circuits connected to the PC-15 through PC-19 and PC-21 output circuits of the program counter 132. The control line 46a to the gate 46 is connected to an "or" gate 149 of FIGURE 4-C. The "or" gate 149 has inputs connected to the PC-7, PC-11, PC-18 and PC-20 output circuits of the program counter 132. The control line 48a to the gate 48 is connected to an "or" gate 151 of FIGURE 4-D. The "or" gate 151 has inputs connected to the output circuits PC-1 through PC-6, PC-8, PC-9, PC-10, PC-12, PC-13 and PC-14.

Refer now to FIGURE 4-E which shows the gates for developing control signals on the set lines to the I reg.-30. The set $IB=1$ line 30b is connected to the input circuit of an "and" gate 184. The "and" gate 184 has input circuits connected to the PC-19, $T_1$, $T_4$ and $B=0$ output circuits of the program counter 132, the flip-flops $T_1$ (see FIGURE 4-W) and $T_4$ (see FIGURE 4-Y) and the gate 74 (see FIGURE 3).

The set $I=0$ line 30a is connected to a signal inverter circuit 186. The inverter circuit 186 has its input circuit connected to an "or" gate 188. The "or" gate 188 has its input circuits connected to the PC-14, PC-15, PC-16, PC-18 and PC-19 output circuits of the program counter 132.

FIGURE 4-F shows the circuits for developing control signals on the read memory line 52a to the gate 52 (see FIGURE 3). The read memory line 52a is connected to a signal inverter 190. The inverter 190 has its input circuit connected to an "or" gate 192. The "or" gate 192 has its input circuit connected to the PC-15, PC-16, PC-17, PC-19, PC-20, PC-21 output circuits of the program counter 132 and the output circuit of an "and" gate 194. The "and" gate 194 has its input circuits connected to the PC-18 output circuit and the output circuit of an "or" gate 196. The "or" gate 196 has its input circuits connected to the $T_2$ and $A_f=15$ output circuits of the timing flip-flop $T_2$ (see FIGURE 4-X) and the gate 112 (see FIGURE 3).

FIGURE 4-G shows a gate for developing control signals on the control line 62a to the gate 62. The control line 62a is connected to an "or" gate 193 which has input circuits connected to the PC-18 and PC-19 output circuits of the program counter 132.

Refer now to FIGURES 4-H, 4-I, 4-J, 4-K, and 4-L which show the gates for applying control signals on the control lines to the gates 66, 80, 86, and 84 and for applying the set signal to the carry flip-flop Ca. The control line 66a to the gate 66 is connected to a gate 274 of FIGURE 4-H. The gate 274 has inputs connected to the PC-2 through PC-6, the PC-5 through PC-10 and the PC-12 through PC-19 output circuits of the program counter 132.

The control line 80a to the gate 80 is connected to an "or" gate 270 of FIGURE 4-E. The "or" gate 270 has inputs connected to the PC-2 and PC-3 output circuits of program counter 132.

The control line 86a to the gate 86 is connected to an "or" gate 272. The "or" gate 272 has input circuits connected to the PC-8 and PC-15 output circuits of the program counter 132.

The control line 84a to the gate 84 is connected to an "or" gate 275 of FIGURE 4-K. The "or" gate 275 has its input circuit connected to the PC-4 and PC-12 output circuits of the program counter 132.

FIGURE 4-L is a schematic diagram showing the gating necessary to set the carry flip-flop $C_a$ into a "1" state. The "set" line to the carry flip-flop is connected to the output of an "or" gate 264. The "or" gate 264 has its input circuits connected to the PC-14 output circuit of the program counter 132 and an "and" gate 266. The "and" gate 266 has its input circuits connected to the CL output circuit of the adder 34 and an "or" gate 268. The "or" gate 268 has its input circuits connected to the PC-4, PC-5, PC-8, PC-9, PC-12, PC-13, PC-15, and PC-16 output circuits of the program counter 132.

FIGURE 4-M shows the gating circuits for developing signals on the set $A=0$ line 40a (see FIGURE 3) to the A reg.-40. The set $A=0$ line 40a is connected to an "or" gate 200. The "or" gate 200 has input circuits connected to an "and" gate 202, an "and" gate 204 and the PC-21 output circuit of the program counter 132. The "and" gate 202 is connected to the PC-18 and $B=0$ (see FIGURE 3) output circuits. The "and" gate 204 has its input circuits connected to the PC-19 and $B=0$ (see FIGURE 3) output circuits.

FIGURE 4-N shows the gating circuits for developing timing signals on the count $B-1$ line 42a to the gate 42 (see FIGURE 3). The count $B-1$ line 42a is connected to an "or" gate 206. The "or" gate 206 has its input circuits connected to "and" gates 208 and 210. The "and" gate 208 has its input circuits connected to the PC-18 and $B \neq 0$ (see FIGURE 3) output circuits.

The set and count lines connected to the $A_f$ reg.-36 are shown in FIGURE 4-O. The set=0 line 36a is connected to an "or" gate 212. The "or" gate 212 has its input circuits connected to an "and" gate 214 and the PC-21 output of program counter 132. The "and" gate 214 has its input circuits connected to the PC-20, the $A_f \neq 15$ and the $B_f \neq 0$ (see FIGURE 3) output circuits.

The set=15 line 36b is connected to an "and" gate 216. The "and" gate 216 has input circuits connected to the PC-7, the $T_1'$ (see FIGURE 4-W) and the $I=0$ (see FIGURE 3) output circuits. The count −1 line 36c is connected to the output circuit of an "and" gate 218. The "and" gate 218 has its input circuits connected to the PC-20 and $A_f \neq 15$ (see FIGURE 3) output circuits.

Refer now to FIGURE 4-P which shows a schematic diagram of the gate for providing count signals to the $B_f$ reg.-38. The count −1 line 38a to the $B_f$ reg.-38 is connected to an "and" gate 220. The "and" gate 220 has input circuits connected to the PC-20, the $B_f \neq 0$ and the $A_f=15$ (see FIGURE 3) output circuits.

Refer now to FIGURE 4-Q which shows a schematic diagram of the gates for providing control signals to the C counter-44. The set=0 line 44a is connected to an "or" gate 222. The "or" gate 222 has inputs connected to the PC-21 output circuit and an "and" gate 224. The "and" gate 224 has its input circuits connected to the PC-18 and CL' (see FIGURE 3) output circuits.

The set=1 line 44b is connected to an "and" gate 226. The "and" gate 226 has input circuits connected to the PC-18 and CL (see FIGURE 3) output circuits.

The count +1 line 44c is connected to an "and" gate 228. The "and" gate 228 has input circuits connected to the output circuits PC-19 and CL (see FIGURE 3).

Refer now to FIGURES 4-R, 4-S and 4-T which show the gating circuits for controlling the gates 92, 94 and 96 and thus the storage of information in digits $(d)$, tens $(t)$ and hundreds $(h)$ sections of the M reg.-26.

The control line 96a for controlling the gate 96 is connected to an "or" gate 232 of FIGURE 4-R. The "or" gate 232 has input circuits connected to the PC-6, PC-10, PC-14, and PC-17 output circuits of the program counter 132.

The control line 94a for controlling the gate 94 is connected to an "or" gate 234 of FIGURE 4-S. The "or" gate 234 has input circuits connected to the PC-5, PC-9, PC-13, and PC-16 output circuits of the program counter 132.

The control line 92a for controlling the operation of the gate 92 is connected to an "or" gate 236 of FIGURE 4-T. The "or" gate 236 has its input circuits connected to the PC-4, PC-8, PC-12, and PC-15 output circuits of the program counter 132.

The set=0 line 26a is connected to an "or" gate 230 of FIGURE 4-U. The "or" gate 230 has its input circuits connected to the PC-7, PC-11, and PC-20 output circuits of the program counter 132.

Refer now to FIGURE 4-V wherein the set lines 130 and associated gating circuits for setting the state of the digits portion of the C reg.-28 into its various states are shown. The set lines 130 of FIGURE 4-L are arranged from left to right in the order in which they normally receive control signals. The lines for setting the C reg.-28 into states 1 and 8 are connected to the output circuits of "or" gates 238 and 240. The "or" gate 238 has its input circuits connected to the PC-2 output circuit and the output circuit of the "and" gate 144 (see FIGURE 4-A). The "or" gate 240 has its input circuits connected to the PC-3 output circuit and the output circuit of the "and" gate 146 (see FIGURE 4-A). The lines for setting the digits $(d)$ section the C reg.-28 into states 0, 2, 7, 6, 4, 3, 10, and 9 are connected to the PC-21, PC-1, PC-4, PC-5, PC-8, PC-9, PC-12, and PC-13 output circuits of the program counter 132. The lines for setting the digits section of the C reg.-28 into states 5 and 11 are connected to the output circuits of the gates 148 and 150 (see FIGURE 4-A).

With the other timing circuits of the timing generator 23 in mind, refer now to FIGURES 4-W, 4-X and 4-Y which show schematic diagrams of three timing flip-flops and associated gating circuits for providing timing signals to the multiplier unit of FIGURE 3. FIGURE 4-W shows a timing flip-flop $T_1$. The timing flip-flop $T_1$ will hereinafter be referred to as the sign flip-flop $T_1$ and to be explained, indicates the part of the multiplier operation during which the sign of the product is to be stored. The sign flip-flop $T_1$ has its input circuit for setting it into a "1" state connected to the PC-2 output circuit of the program counter 132. The reset input circuit of the sign flip-flop $T_1$ is connected to an "or" gate 242. The "or" gate 242 has its input circuits connected to the PC-21 output circuit of the program counter 132 and the output circuits of "and" gates 244 and 246. The "and" gate 244 has its input circuits connected to the PC-18 and $B=0$ (see FIGURE 3) output circuits. The "and" gate 246 has its input circuits connected to the PC-19 and $B=0$ output circuits.

FIGURE 4-X shows the timing flip-flop T2 and associated gating for indicating when the multiplication unit for FIGURE 3 is carrying out the cycle of steps of multiplying the first multiplier operand digit times each of the multiplicand operand digits. The first multiplier cycle flip-flop T2 has its input circuit for setting it into a "1" state connected to an "or" gate 248. The "or" gate 248 has its input circuits connected to the PC-2 output circuit of the program counter 132 and an "and" gate 250. The "and" gate 250 has its input circuits connected to the PC-20, $A_f=15$, and $B_f \neq 0$ (see FIGURE 3) output circuits. The input circuit of the first multiplier cycle flip-flop T2 for resetting it into a "0" state is connected to an "or" gate 253. The "or" gate 253 has its input circuits connected to the PC-21 output circuit and "and" gates 252 nd 254. The "and" gate 252 has its input circuits connected to the PC–18 and B=0 (see FIGURE 3) output circuits. The "and" gate 254 has its input circuits connected to the PC–20, $A_f$=15 and $B_f$=0 (see FIGURE 3) output circuits.

FIGURE Y shows a schematic diagram of a timing flip-flop T4 and associated gating circuits for indicating the sign of the product. The product sign flip-flop T4 has an input circuit for setting it into a "1" state connected to an "or" gate 256. The "or" gate 256 has its input circuits connected to the output circuit of "and" gates 258 and 260. The "and" gate 258 has its input circuits connected to the PC–7, $T_1$ (see FIGURE 4–W) and $I_B$ (see FIGURE 3) output circuits. The "and" gate 260 has its input circuits connected to the same output circuits as gate 258 except that it is connected to the PC–11 rather than the PC–7 output circuit of the program counter 132. The input circuit of the product sign flip-flop T4 for resetting it into a "0" state is connected to an "or" gate 262. The "or" gate 262 has its input circuits connected to the "and" gate 260 and the PC–2 and PC–21 output circuits of the program counter 132.

Operation

Before explaining an example illustrating the operation of the multiplication unit of FIGURE 3, consider the sequence of operation of the multiplication unit as illustrated in the computer flow diagram of FIGURE 8. The computer flow diagram of FIGURE 8 contains boxes with interconnections which illustrate the sequence of operation of the indicated registers, the flip-flops and the memory of the multiplication unit of FIGURE 3. The various command digits, operands, partial product digits and circuits are illustrated by abbreviations. The definitions of the abbreviations used in FIGURE 10 are shown in the Table III at the end of the description of operation. Each box in the flow diagram indicates the operation during a single state or Program Count of the program counter 32 (see FIGURE 4–A). The states of the program counter 32 and therefore of the multiplier unit will hereinafter be referred to as Program Counts. Thus, there are boxes referenced by the symbols PC–1 through PC–21 corresponding to the twenty-one Program Counts and the output lines of the program counter 132.

The normal sequence of operation of the multiplication unit of FIGURE 3 as illustrated in FIGURE 8 is by counting out of one Program Count and into the next higher numbered Program Count. However, Program Counts are sometimes skipped depending on the operation performed by the multiplication unit as hereinafter described.

Refer now to FIGURE 8 and consider the sequence of operation. During Program Count "1," an order (o) digit is read out of the memory 24 and stored in the 0 reg.–32. It will be noted that FIGURE 8 indicates that Program Count "2" may be entered from Program Count "1" or that other Program Counts (not shown) may be entered. The decision as to the operation is made depending on whether the order digit read out of the memory 24 and stored in the I reg.–30 is a digit 3, thereby indicating that a multiplication sequence of operation is to take place, or another type order digit is read out of the memory 24 (i.e. add order digit, etc.). If the order digit is a 3 then Program Count 2 is entered. If another type order digit is read out, then sequences of operation are entered by the processor 10.

It will be noted that the gates of FIGURES 4–A through 4–Y do not have a term therein dependent on the type of order digit read out of the memory 24. However, this term is required in the actual processing machine model but is left out herein in order to simplify the description of the invention.

During Program Counts "2" and "3," the multiplier and multiplicand field length digits bf and af are read out of the memory 24 and modified by substracting one unit from the magnitude of each, and the modified field length digit stored in the $B_f$ and $A_f$ registers 38 and 36, respectively. During Program Counts "4," "5" and "6," the three digits of the address of the most significant digit of the multiplier operand b1, b2 and b3, are read out of the memory 24 and the magnitude represented by the three address digits added to the number represented by the modified multiplier field length digit (bf–1) stored in the $B_f$ reg.–38. The three digits of the modified multiplier address are then stored in the M reg.–28.

During Program Count "7," the digit of the multiplier operand (b OP) specified by the address stored in the M reg.–26 is read out of the memory 24 and stored in the B reg.–42. During Program Counts "8," "9" and "10," the three digits of the address of the most significant digit of the multiplicand operand, a1, a2 and a3, are read out of the memory, the magnitude thereof added to the amount represented by the modified multiplicand field length digit stored in the $A_f$ reg.–36 and the resulting modified address stored in the M reg.–26. During Program Count "11," the digit of the multiplicand operand (a OP) specified by the address stored in the M reg.–26 is read out and stored in the A reg.–40. During Program Counts "12," "13" and "14," the three digits of the address for storage of the most significant digit of the product, c1, c2 and c3, are read out of the memory 24 and the magnitude represented thereby added to the modified field length digit (bf–1) stored in the $B_f$ reg.–38 and the modified address stored in the M reg.–26. Subsequently during Program Counts "15," "16" and "17," the modified address stored in the M reg.–26 is read out through the I reg.–30 to the adder 34 and the magnitude of the modified field length digit stored in the $A_f$ reg.–36 plus one unit is added to the modified address. The result, the address of a product digit storage location, is then stored back in the M reg.–26.

The operation during Program Count "18" depends on whether the multiplier digit being multiplied is the least significant digit or not. In general, if the least significant multiplier digit is being multiplied then the only thing of significance which happens during Program Count "18" is that the magnitude of the multiplier digit in the B reg.–42 is counted down one unit in preparation for multiplication during Program Count "19." However, if a digit of the multiplier other than the least significant digit is being multiplied then a partial product digit may have been stored in the memory storage location specified by the address stored in the M reg.–26 and accordingly, it is read out and stored in the I reg.–30 for addition into the partial product digit to be formed during Program Count "19." If any carry outs have previously been obtained during the multiplication times the next lower ordered multiplicand digit, therefore stored in the C counter–44, this carry is added to the partial product digit stored in the I reg.–30. If a carry out is obtained by this addition, a digit one is stored in the C counter–44. If there is no carry a digit zero is stored in the C counter–44.

During Program Count "19" the multiplicand operand digit stored in the A reg.–40 is added to the contents of the I reg.–30 the number of times indicated by the magnitude of the multiplier digit stored in the B reg.–42. During each addition of the multiplicand digit, the magnitude of the multiplier digit is counted down one unit by the B reg.–42. When the number of additions indicated by the magnitude of the multiplier digit is completed, the B reg.–42 is storing a digit zero and the final partial product digit is stored in the I reg.–30, also the carry out is represented by the state of the C counter–44. If the product is a negative number and this is the least significant partial product digit indicated by the "1" state of both the sign cycle flip-flop T1 and the product sign flip-flop T4, the IB flip-flop of the I reg.–30 is set into a "1" state.

During Program Count "20," the partial product digit stored in the I reg.–30, is written in the memory 24.

The $A_f$ reg.–36 not only indicates the amount by which addresses are to be modified but also keeps track of the multiplicand digit being multiplied. As described in the general description, a multiplier digit is multiplied times each digit of the multiplicand before the next higher ordered digit of the multiplier is multiplied times the digits of the multiplicand. This is implemented in the multiplier by causing the magnitude of the modified multiplicand field length digit stored in the $A_f$ reg.–36 to be decreased by one unit during Program Count "19" after a multiplicand digit has been fully multiplied out and is to be stored. After Program Count "20," Program Count "4" is again entered. Thus, when Program Counts "8," "9" and "10" are subsequently re-entered the multiplicand field length digit is one unit smaller than during the previous cycle therethrough causing the address of the next higher ordered digit of the multiplicand operand to be formed and subsequently read out and stored in the A reg.–40. However, the magnitude of the modified multiplier field length digit is the same, therefore, the same multiplier operand digit is multiplied times the new multiplicand digit.

When the multiplication unit again steps into Program Count "20" and the state of the $A_f$ reg.–36 is equal to "15" (the $A_f$ reg.–36 counts from state "0" to "15"), a multiplier digit has been multiplied times each of the multiplicand digits. If the $A_f$ reg.–36 is in state "15" and the B reg.–32 is not in state "0," indicating there are more multiplier digits to be multiplied, the state of the $B_f$ reg.–38 is counted down one and Program Count "3" is entered and the multiplicand field length digit $a_f$ is again read out of the memory 24 decreased by one unit and stored in the $A_f$ reg.–36. The digits of the multiplicand are then multiplied times the new multiplier operand digit in a similar fashion to that described hereinabove.

When each of the multiplier digits have been multiplied times each of the multiplicand digits and the multiplication unit is in state "20," the $B_f$ reg.–38 is in state "0" and Program Count "21" is entered where the registers and flip-flops are reset to "0" ready to enter Program Count "1" again to execute another command.

Consider now the operation of the multiplication unit of FIGURE 3 while executing the command word stored in word storage location "53" of the memory 24 shown by way of example in FIGURE 9 as described hereinabove in the general description. FIGURE 10 shows an example of the multiplicand and multiplier operands and the storage content of the product storage field of the memory 24 designated by the addresses of the command of FIGURE 9. Since the multiplicand and multiplier operands are identical to those of the example of Table II the product will be identical. The multiplication unit enters Program Count "20," eight successive times during the execution of the command. FIGURE 10 also shows the storage content of the product storage field during each of the eight Program Counts "20" entered during the execution of the command.

FIGURE 11, including FIGURES 11-A and 11-B together illustrate the sequence of operation of the various indicated registers and flip-flops of FIGURE 3 and FIGURE 4-A through FIGURE 4-Y, and should be referred to in the following discussion. Each row of FIGURES 11-A and 11-B is a different Program Count. In the following discussion it is assumed that clock pulses occur at the end of each Program Count. In FIGURES 11-A and 11-B the states of the registers and flip-flops are shown and as indicated exist throughout the corresponding Program Count, up until a clock pulse occurs. An exception exists in regards to the I reg.–30. The state of the I reg.–30 is shown after the strobe pulse (SP) unless otherwise specified in the following discussion.

It will be noted that in the column showing the states of the program counter 132, each Program Count "20" has an asterisk (*), followed by a number in the upper left hand corner of the row. This number indicates the number of times Program Count "20" has been entered in execution of the command and can be used as a reference to determine the storage content of the product field shown in FIGURE 10 following the specified Program Count "20." Also, the following discussion will be divided into sections and each section headed by a number followed by the symbol representing an output line of the program counter 132. These symbols are used in order to allow the reader to readily find the part of FIGURES 11-A and 11-B being described in the section. Thus, for example, 0 PC–1 indicates that Program Count "20" has not been entered for the first time and the multiplication unit of FIGURE 3 is in Program Count "1."

Before considering the details of operation during Program Count "1" refer generally to the operation of the circuits of FIGURE 4-B and FIGURE 4-F which are part of the control for writing in the memory 24.

The input signals of the "or" gate 178 (FIGURE 4-B) are such that a control signal is applied to the signal inverter circuit 176 only when a digit stored in the I reg.–30 is not to be written in the memory 24. When a control signal is not applied thereto the signal inverter 176 applies a control signal on the write memory line 50a. Thus, as indicated in FIGURE 4-B the inverter circuit will apply a control signal on the write memory line 50a during each of the Program Counts except Program Counts "15," "16," "17," "18," "19" and "21." Thus, during Program Count "1" a control signal is applied on the write memory line 50a to the gate 50 causing the output of the I reg.–30 to be coupled to the write input circuit of the memory 24.

Similarly, the "or" gate 192 (FIGURE 4-F) applies a control signal to the signal inverter 190 only when a digit is not to be read out of the memory 24. Thus, a control signal is applied to the inverter 190, therefore, a control signal is not applied to the read memory line 52a during Program Counts "15," "16," "17," "19," "20," "21" and Program Count "18" if the first multiplier flip-flop T2 is in a "1" state or the $A_f$ reg.–30 is storing a decimal number 15. Therefore, a digit is read out of the memory 24 during the strobe pulse (SP), and stored in the I reg.–30, and then rewritten back into the same memory location at the write pulse (WP) (during the same Program Count) during Program Counts "1" through "14." Thus, a digit read out of the memory 24 is rewritten so that it may be re-read out again at a subsequent time. During Program Count "18," a digit of information is sometimes read out of the memory 24 but is never re-written. This causes a digit "0" to be written in the digit storage location from which the digit is read. During Program Count "20" a digit stored in the I reg.–30 is written in the memory 24.

The I reg.–30 is reset with all of its flip-flops in a "0" state in response to a control signal on the set=0 line 30a at the end of each Program Count with certain exceptions. To this end, the inputs to the "or" gate 188 (FIGURE 4-E) are such that a control signal is applied to the inverter 186 during Program Counts "14," "15," "16," "18," and "19." The inverter 186 inverts the output signal of the gate 188 causing a control signal on the set I=0 line 30a during each Program Count except those for which the gate 188 develops a control signal.

*0 PC–1*

Assume now, that Program Count "1" is entered. Also assume that when the multiplication unit enters Program Count "1" all of the registers and flip-flops have been set in to state, "0," as hereinafter explained, except for the hundreds ($h$) and tens ($t$) sections of the C reg.–28. Assume that the hundreds ($h$), tens ($t$) and digits ($d$) sections of the C reg.–28 are in states "5," "3" and "0," respectively. The clock pulse which triggered the program Counter 132 (see FIGURE 4-A) into Program Count "1" also caused the memory timing generator 54 to go into a timing cycle. During the timing cycle the memory timing generator 54 applies a read pulse to the memory 24.

At the beginning of Program Count "1" the following gate conditions exist; the "and" gate 142 (FIGURE 4–A) applies a control signal to the set=2 input circuit of Program counter 132 (see FIGURE 4–A) into Program applies a control signal to the control line 48a of gate 48; the set=2 input circuit connected to set lines of 30 (see FIGURE 4–V) receives a control signal; and control signals are applied to the gate 65 (FIGURE 3), the write memory line 50a, the read memory line 52a and the set=0 lines 30a.

A digit 3 is stored in the memory storage location 5–3–0. Thus, the read pulse (RP) during Program Count "1" causes the digit 3 to be read out of the memory 24. The strobe pulse (SP) developed by the generator 54 during the read pulse (RP) causes the digit 3 to be stored by the I reg.–30. The write pulse (WP) developed by the timing generator 54 during Program Count "1" causes the digit 3 signals stored in the I reg.–30 to be rewritten in the same memory location from which it was read, this memory location still being addressed by the C reg.–28.

The clock pulse signal at the end of Program Count "1" causes the digit 3 signals to be stored in the 0 reg.–32, the digits (d) section of the C reg.–28 to be set into state "2" and the program counter 132 to be set into Program Count "2."

*0 PC–2*

At the beginning of Program Count "2" the C reg.–28 is in state 5–3–2, and each of the other flip-flops and registers are in state "0." The address stored in the C reg.–28 is the address of the multiplier field length digit $b_f$ (see FIGURE 9).

During Program Count "2" the following gate conditions exist. The "or" gate 258 applies a control signal to the set=1 line of 130 (see FIGURE 4–V); a control signal is applied to the control line 48a for the gate 48 by the "or" gate 151 (FIGURE 4–D); a control signal is applied to the read memory line 52a (see FIGURE 4–F) to the gate 52 (see FIGURE 3); a control signal is applied on the write memory line 50a (see FIGURE 4–B) to the gate 50 (FIGURE 3); the "or" gate 66 (FIGURE 4–H) applies a control signal to the control line 66a to the gate 66 (FIGURE 3); the "or" gate 270 (FIGURE 4–I) applies a control signal to the control line 80a to the gate 80 (FIGURE 3); a control signal is applied to the "set" input circuit of the sign flip-flop T1 (FIGURE 4–W); the "or" gate 248 (FIGURE 4–X) applies a control signal to the "set" input circuit of the first multiplier cycle flip-flop T2; and a control signal is applied on the control line to the gate 88 (FIGURE 3). In addition the "or" gate 262 applies a control signal to the reset input circuit of the product sign flip-flop T4, however, for purposes of illustration of this invention it is assumed that the sign flip-flop is already in a "0" state during Program Count "2" and this control signal can be disregarded.

The read pulse (RP) during Program Count "2" causes the C reg.–28 to address the memory storage location 5–3–2 and the $b_f$ field length digit 2 (see FIGURE 9) is read out of the memory 24. During the strobe pulse (SP) the digit 2 read out of the memory 24 is stored in the I reg.–30.

The gates 66 and 80 are receiving control signals on their control lines and couple the I reg.–30 and the radix −1 circuit to the adder 34. Therefore, the adder 34 substracts one decimal unit from the digit 2 stored in the I reg.–30 and develops output signals representative of a decimal digit 1.

The clock pulse signal at the end of Program Count "2" sets the digits section of the C reg.–28 into state "1," causes the decimal digit one signal developed at the output of the adder 34 to be stored in the $B_f$ reg.–38 and sets the first multiplier cycle flip-flop T2 and sign flip-flop T1 into state "1."

*0 PC–3*

At the beginning of Program Count "3" the C reg.–28 is in state 5–3–1, the $B_f$ reg.–38 and the 0 reg.–32 are storing decimal digits 1 and 3, and the timing flip-flops T1 and T2 are both in state "1." The other registers are storing a digit 0 and the rest of the flip-flops are in state "0."

The gate conditions of the multiplication unit of FIGURE 3 during Program Count "3" are similar to that during Program Count "2" except that the "or" gate 240 (FIGURE 4–V) applies a control signal to the set=8 line of 130 to the C reg.–28, as compared with a control signal on the set=1 line, and the gate 90 (see FIGURE 3) receives a control signal rather than the gate 88 (see FIGURE 3).

Thus, during the read pulse (RP) the storage location 5–3–1 is addressed by the C reg.–28 and the $af$ field length digit 3 is read out and stored in the I reg.–30. The adder 34 subtracts one unit therefrom and during the clock pulse at the end of Program Count "3," a digit 2 is stored in the $A_f$ reg.–36 and the digits section of the C reg.–28 is set into state "8."

*0 PC–4*

At the beginning of Program Count "4" the C reg.–28 is in state 5–3–8, the M reg.–26, the C counter 44, the A reg.–40 and the B reg.–42 are each storing a digit 0, the flip-flops Ca and T4 are each in state "0" and the timing flip-flops T1 and T2 are each in state "1."

During Program Count "4" the following gate conditions exist: a control signal is applied on the set=7 line of 130 to the C reg.–28; the "or" gate 151 (FIGURE 4–D) applies a control signal on the control line 48a to the gate 48; control signals are applied to the write memory line 50a (see FIGURE 4–B) and the read memory line 52a (see FIGURE 4–F); the gate 274 (see FIGURE 4–H) applies a control signal on the control line 66a to the gate 66; the gate 236 (see FIGURE 4–T) applies a control signal on the control line 92a to the gate 92 (see FIGURE 3); and the gate 275 (FIGURE 4–K) applies a control signal on the control line 48a to the gate 48.

During Program Count 4 the read pulse (RP) causes the memory storage location 5–3–8 to be addressed and the $b1$ operand address digit, a decimal digit 3, to be read out of the memory 24, and at the strobe pulse (SP) stored in the I reg.–30. The adder 34 adds the decimal digit 3 stored in the I reg.–30 to the decimal digit 1 stored in the $B_f$ reg.–38 and during the clock pulse at the end of Program Count "4" the result a decimal digit 4 is stored in the digits (d) section of the M reg.–26 and the digits (d) section of the C reg.–28 is set into state "7."

*0 PC–5*

The operation during Program Count "5" is similar to that during Program Count 4 except that the gates 84 and 92 do not receive control signals and the "or" gate 234 (see FIGURE 4–S) applies a control signal on the control line 94a to the gate 94 (see FIGURE 3). Thus, during Program Count "5" the storage location 5–3–7 is addressed by the M reg.–26 and the $b2$ operand address digit, a digit 0, is read out of the memory 24 and stored in the I reg.–30. Since there is no digit input signal at the "Y" input circuit of the adder 34, and there is no carry from the addition on the $b1$ operand address digit, a decimal digit "0" is developed at the output of the adder 34. During the clock pulse signal at the end of Program Count "5" the unaltered address digit "0" is stored in the tens (5) section of the M reg.–26, and the digits (d) section of the C reg.–28 is set into state "6."

*0 PC–6*

The operation of the multiplier during Program Count "6" is similar to that during Program Count "5" except that the "or" gate 232 (FIGURE 4–R) applies a control signal to the control line 96a to the gate 96. Thus, during Program Count "6" the memory storage location 5–3–6 is addressed and the b3 operand address digit, a decimal digit 2, is read out of the memory 24 and stored unaltered in the hundreds (h) section of the M reg.–26. The digits (d) section of the C reg.–28 does not receive a control signal during Program Count "6" therefore does not change states.

0 PC–7

During Program Count "7" the M reg.–26 is in state 2–0–4, and the timing flip-flop T1 is in state "1."

During Program Count "7" before the strobe pulse (SP) the following gate conditions exist: The "or" gate 149 (FIGURE 4–C) applies a control signal to the line 40a to the gate 46 (see FIGURE 3); the gates 52 and 50 (see FIGURE 3) receive control signals; the gate 230 (FIGURE 4–U) applies a control signal on the set=0 line 26a to the M reg.–26; and the gate 68 (see FIGURE 3) receives a control signal.

Thus, during the read pulse (RP) the memory storage location 2–0–4 is addressed by the M reg.–26 and the decimal digit (–)2 (see FIGURE 10) of the multiplier is read out and stored in the I reg.–30 during the occurrence of the strobe pulse (SP).

Since a negative decimal digit was stored in the I reg.–30 the sign flip-flop IB is in a "1" state. Thus, after the strobe pulse, the following gate conditions exist: The gates 258 and gate 256 (see FIGURE 4–Y) apply a control signal to the "set" input circuit of the product sign flip-flop T4; and the "and" gate 148 (FIGURE 4–A) applies a signal at the set=8 input circuit of the Program Counter 132 and to the set=5 input circuit of the lines 130 (FIGURE 4–V) to the C reg.–28.

The clock pulse signal at the end of Program Count "7" sets the digits (d) section of the C reg.–28 into state "5," sets the M reg.–26 into state "0," stores the multiplier digit 2 in the B reg.–42 and triggers the product sign flip-flop T4 into a "1" state.

It should be noted that if the multiplier digit stored in storage location 2–0–4 were positive that the sign flip-flop T4 would remain in a "0" state. If the multiplier digit stored in storage location 2–0–4 were a digit "0" and the sign flip-flop T1 in a "0" state, indicating the product sign is positive, then the gate 150 (FIGURE 4–A) would apply control signals to the set=12 input of the Program Counter 132 and to the set=11 input circuit of the digits section of the C reg.–28 (see FIGURE 4–V) and Program Counts "8" through "11" would be skipped.

0 PC–8 through 0 PC–11

During Program Counts "8" through "11" the operation of the multiplier unit of FIGURE 3 is similar to that during Program Counts "4" through "7," and may be understood with reference to the flow diagram of FIGURE 8, the FIGURES 3, 4–A through 4–Y and the description given above for Program Counts "4" through "11." However, during Program Counts "8" through "10," the address of the most significant digit of the multiplicand operand, address 2–0–0, is read out of the memory 24, and added to the magnitude of the modified multiplicand field length digit 2 stored in the $A_f$ reg.–36 and the resultant modified address 2–0–2 stored in the M reg.–26. During Program Count "11" the least significant digit of the multiplicand operand stored in the storage address by 2–0–2, a digit 6 (see FIGURE 10), is addressed by the M reg.–26, readout of the memory 24, and stored in the A reg.–40.

It should be noted that if the multiplicand operand digit to be read out of the memory 24 during the first multiplier cycle (indicated by the "1" state of the flip-flop T1) is negative, the IB flip-flop (see FIGURE 3) would develop a control signal at the $I_B$ output circuit during Program Count "11." This would cause the gates 260 and 262 (see FIGURE 4–Y) to apply a control signal to the "reset" input circuit of the product sign flip-flop T4 causing it to be reset to a "0" state, thereby indicating that the product is a positive number. However, in this case the multiplicand is positive and the multiplier is negative and the product sign flip-flop T4 remains in a "1" state indicating a negative product.

0 PC–12 through 0 PC–14

During Program Counts "12," "13" and "14" the C reg.–28 stores the addresses 5–3–11, 5–3–10 and 5–3–9, respectively, and, similar to that during the Program Counts "4," "5" and "6," the C reg.–28 addresses the memory 24 causing the address of the most significant digit of the product field, address 2–0–5, to be read out of the memory 24 a digit at a time. During Program Count "12" the digit 1 stored in the $B_f$ reg.–38 is added to the digit "5" of the beginning product address and the resultant digit 6 is stored in the digits (d) section of the M reg.–26. Since there is not then any carry, the digits 0 and 2 of the product address are stored unaltered in the tens (t) and hundreds (h) sections of the M reg.–26 during Program Counts "13" and "14," respectively.

During Program Count "14" the A reg.–36 is storing a digit 2, therefore not a decimal number 15. Also, the gate 124 (FIGURE 4–L) applies a control signal to the set input circuit of the carry flip-flop Ca, the gate 193 (FIGURE 4–G) applies a control signal on the line 62a to the gate 62 (FIGURE 3) and a control signal is applied to the gate 124 (see output of M reg.–26 of FIGURE 3). Thus, the clock pulse signal at the end of Program Count "14" not only stores the digit 2 in the hundreds (h) section of the M reg.–26 but also stores the digit 6 stored in the digits (d) section of the M reg.–26 in the I reg.–30 and sets the carry flip-flop Ca into a "1" state.

0 PC–15 through 0 PC–17

During Program Count "15" the M reg.–26 is storing the digits 2–0–6, the I reg.–30 is storing a decimal digit 6 and the carry flip-flop Ca is in a "1" state. Also during Program Count "15" control signals are applied to the gates 122 (see output of M reg.–26) 62, 66, and 92a (see FIGURE 3 for each of these gates). It will also be noted that a digit is not read out of the memory 24 during Program Count "15," therefore the digit 6 remains in the I reg.–30 even after the strobe pulse (SP). Thus, during Program Count "15" the digit 6 stored in the I reg.–30 is added to the modified multiplicand field length digit 2 stored in the $A_f$ reg.–36 and to the digit 1 represented by the "1" state of the Ca flip-flop and the adder 34 develops coded output signals representing a decimal digit 9, which are stored in the digits (d) section of the M reg.–26. Also the digit 0 stored in the the tens (t) section of the M reg.–26 is stored in the I reg.–30 and the carry flip-flop Ca is reset to a "0" state.

0 PC–16

During Program Count "16" a digit 0 is stored in the I reg.–30. Also, control signals are applied to the gates 120 (see output of M reg.–26, FIGURE 3) 66 (FIGURE 3) and 96 (see input of M reg.–26, FIGURE 3). Thus the decimal digit 2 in the hundreds (h) section of the M reg.–30 is stored in the I reg.–30 and the tens (t) section of the M reg.–26 re-stores a decimal digit "0."

0 PC–17

The operation of the multiplication unit of the FIGURE 3 during Program Count "17" is similar to that during Program Count "16." Thus, during Program Count "17" a decimal digit 2 is re-stored in the hundreds (h) section of the M reg.–26.

0 PC–18

At the beginning of Program Count "18" the M reg.–26 is storing digits 2–0–9 which is the address for storage of the least significant digit of the product (see FIGURE 10). At the end of Program Count "17" the I reg.–30 is reset and during Program Count "18" is storing a digit 0. Also during Program Count "18" the first multiplier cycle flip-flop T2 is in state "1," the A_f reg.–36 is not storing a number 15 causing a control circuit at the output of the gate 114 (see FIGURE 3), the C counter–44 is storing a digit 0, and the B reg.–42 is not storing a digit 0 therefore the gate 76 (see FIGURE 3) develops a control signal.

The following gate conditions exist during Program Count "18": the gates 50, 52, 46, 62, 66 and 82 (see FIGURE 3 for all gates) receive control signals; and the gates 217 and 219 (see FIGURE 4–P) apply a control signal to the count −1 line 38a. The adder 34 adds the digit 0 stored in the I reg.–30 and the digit 0 stored in the C counter–44 but does not develop a carry out signal, therefore a control signal is applied on the CL' line of the adder 34. Thus, in addition to the above gate conditions the gates 224 and 226 (see FIGURE 4–Q) apply a control signal to the set=0 line 44a to the C counter–44. It should also be noted that no control signal is applied on the read memory line 52a by the circuits of FIGURE 4–F. Thus, the contents of the storage location 2–0–9 is read out, however is not re-stored in the I reg.–30.

The clock pulse signal at the end of Program Count "18" causes the digit 0 at the output of the adder 34 to be stored in the I reg.–30 and causes the state of the B reg.–42 to be counted down by one unit. Also the C counter–44 is set to state "0," since the C counter–44 is already in state "0" the set signal has no effect thereon.

0 PC–19 (first time)

During Program Count "19" the actual multiplication of the multiplier and multiplicand operand digits take place. A multiplier digit is multiplied times a multiplicand digit by adding the multiplicand digit to itself the number of times represented by the original magnitude of the multiplier digit. To this end, the multiplicand digit is added to itself once each time the magnitude of the multiplier digit stored in the B reg.–42 is decreased by one until the digit stored in the B reg.–42 is equal to 0.

At the beginning of Program Count "19" the A reg.–40 is storing a digit 6, the B reg.–42 is storing a digit 1, and the I reg.–30 is storing a digit 0. Therefore the gate 118 (see FIGURE 3) develops a control signal.

At the beginning of Program Count "19" the following gate conditions exits: control signals are applied to the gates 62, 66 and 70 of FIGURE 3; and the gates 162 and 166 apply another control signal to the set=19 input of the program counter 132. Thus, the adder 34 adds the digit 0 stored in the I reg.–30 to the digit 6 stored in the A reg.–40 and develops output signals representing the result, a digit 6. Thus, the clock pulse signal at the end of Program Count "19" causes the I reg.–30 to store the digit 6 developed at the output of the adder 34 and count the magnitude of the multiplier digit stored in the B reg.–42 down by one unit. The Program Counter 132 remains in Program Count "19."

0 PC–19 (second time)

During the second time interval that the multiplier unit of FIGURE 3 is in Program Count "19" the I reg.–30 is storing a digit in 6, the A and B registers 40 and 42 are storing digits 6 and 0, the sign flip-flop T1 and the product sign flip-flops T4 are both in state "1." The gates 204 and 200 (see FIGURE 4–M) apply a control signal to the set A=0 line 40a; the gates 246 and 242 (see FIGURE 4–N) apply a control signal to the "reset" input of the sign flip-flop T1; the gate 184 (see FIGURE 4–E) applies a signal to the set IB=1 input circuit of the sign flip-flop IB; and the gates 170 and 168 apply a control signal to the set=20 input circuit of the Program Counter 132.

Thus, the decimal digit 6 stored both in the I reg.–30 and A reg.–40 are added together by the adder 34. The sum of a digit 6 and a digit 6 is a numeric digit 2 plus a one carry. Thus, a numeric digit 2 along with a signal on the CL line of the adder are developed. Therefore, the gate 228 (see FIGURE 4–Q) applies a control signal on the count +1 line 44c to the C counter–44.

The clock pulse signal at the end of Program Count "19" sets the sign flip-flop IB into a "1" state, stores a digit 2 in the numeric section of the I reg.–30, counts the counter 44 into state "1," sets the A reg.–40 into state "0," resets the sign flip-flop T1 into a state "0," and counts the Program Counter 132 into Program Count "20."

1 PC–20

Upon entering Program Count "20" for the first time the multiplication unit of FIGURE 3 has finished its first multiplication and has formed the first partial product digit, including the product sign both of which are now stored in the I reg.–30.

During Program count "20" the M reg.–26 is still storing the address digits 2–0–9, the C counter–44 is storing a digit "1," and the A_f reg.–36 is storing a digit 2. Thus the gates 110 and 115 (see output of A_f reg.–36, FIGURE 3) develop control signals and the following gate conditions exist: the gate 146 (see FIGURE 4–A) applies a control signal to the set=4 input of the Program Counter 132 and to the set=8 input of the digits section of the C reg.–28; the gate 230 (see FIGURE 4–U) applies a control signal on the set=0 line 26a to the M reg.–26; and the gate 218 (see FIGURE 4–O) applies a control signal on the count −1 line 36c of the A_f reg.–36.

Therefore, during Program Count "20" the write pulse from the timing generator 54 causes the memory 24 to write the digit (−)2 stored in the I reg.–30 in the memory location 2–0–9, addressed by the M reg.–26. The clock pulse at the end of Program Count "20" causes the storage content of the A_f reg.–36 to be decreased by one unit, the M reg.–26 to be reset to state "0"; the digits section of the C reg.–28 to be set into state "8" and the Program Counter 132 to be set into Program Count "4."

Refer now to FIGURE 10. As indicated in FIGURE 10, following the first Program Count "20" the product field is storing miscellaneous digits of information in memory locations 2–0–5 through 2–0–8. However, memory location 2–0–9 is now storing the partial product digit (−)2. Thus, the first partial product digit has been formed and is identical to the Table II.

1 PC–4 through 1 PC–17

With reference to FIGURE 11–A it will be noted that during Program Count "4" the states of the registers and flip-flops are identical to that during the previous Program Count "4" except that the sign flip-flop T1 is in state "0," the A_f reg.–36 is storing a digit 1 rather than a digit 2, and the C counter–44 is now storing a digit 1 rather than a digit 0.

The operation of the multiplication unit of FIGURE 3 during the following Program Counts "4" through "17" is similar to that described above for the preceeding Program Counts "4" through "17" and may be understood with reference to the flow diagram of FIGURE 10, and the schematic diagrams of FIGURES 3 and 4–A through 4–Y. The important differences to be noted are that during Program Count "8" when the least significant digit of the multiplicand address (a1) a digit "0" (see FIGURE 9) is read out of the memory 24 and added to the storage content of the A_f reg.–36, a digit 1, the resulting address digit is a digit 1. Thus, the modified multiplicand address stored in the M reg.–26 during Program Counts "8," and "9" and "10" will be the address 2–0–1, which is the address of the next to the least significant multiplicand operand digit, a digit 2 (see FIGURE 10). Thus, during Program Count "11" the multiplicand operand digit 2 is read out of the memory 24 and stored in the A reg.–40.

During Program Counts "12" through "17" when the modified field length digit "1," stored in the A reg.–36, is added to the beginning address of the product field the address of the product storage location 2–0–8 is formed, in comparison with the address 2–0–9 formed during the preceeding Program Counts "15" through "17."

1 PC–18

At the beginning of the second Program Count "18" the M reg.–26 is storing the address 2–0–8, the I reg. is storing a digit 0, the C counter–44 is storing a digit 1 (stored as a result of the carry from the privious multiplication—see 0 PC–19), the A reg.–40 and the B reg.–42 are each storing a digit 2, and the $A_f$ reg.–36 is storing a digit 1; therefore, the gate 110 (see output of the $A_f$ reg.–36, FIGURE 3) develops a control signal.

Also during Program Count "18" the following gate conditions exist: the gates 196, 194 and 192 apply a control signal to the inverter 190 (see FIGURE 4–F), therefore the inverter 190 does not apply a control signal to the read memory line 52a to the gate 52 (see FIGURE 3); control signals are applied to the gates 82, 66 and 62 (all of FIGURE 3), and the count −1 line 42a of the B reg.–42 (see FIGURE 3). Thus the adder 34 adds the digit 1 stored in the C counter–44 and digit 0 stored in the I reg.–30 and the result, a digit 1 represented by signals at the numeric output circuit of the adder 34. Since there is no carry out of the addition, the CL' output line of the adder 34 receives a control signal causing the gates 222 and 224 (see FIGURE 4–Q) to apply a control signal to set=0 line 44a to the C counter–44. Thus during the clock pulse at the end of the Program Count "18" the C counter–44 is reset to 0, the magnitude of the digit 2 stored in the B reg.–40 is decreased by one unit, and a digit 1 (output of adder 34) is stored in the I reg.–30.

1 PC–19 (first and second time)

During the subsequent two clock periods the multiplication unit is in Program Count "19" and the multiplicand digit stored in the A reg.–40 is added to the digit stored in the I reg.–30 twice and the result, a digit 5, is stored in the I reg.–30.

2 PC–20

During Program Count "20" for the second time the M reg.–26 is storing the address 2–0–8, the I reg.–30 is storing the second partial product digit, a digit 15, and the $B_f$ reg.–36 is storing a digit 1. Thus during the write cycle of the memory 24 the digit 5 stored in the I reg.–30 is written in the memory location 2–0–8 addressed by the M reg.–26. During the clock pulse signal at the end of Program Count "20," the $A_f$ reg.–36 is counted down such that it now stores a digit 0, and the digits section of the C reg.–28 is set into state "8."

Thus as indicated in FIGURE 10 after the second Program Count "20" the storage location 2–0–8 is now storing a digit 5. This is the same as the second partial product digit shown in Table II.

2 PC–4 through 3 PC–20

The operation of the multiplier of FIGURE 3 during Program Counts "4" through "18" at this point is similar to that during the first cycle through Program Counts "4" through "18." However, the state of the $A_f$ reg.–36 is now zero, therefore during Program Counts "8" through "10" (see FIGURE 8) the address of the most significant digit of the multiplicand operand is read out and stored unaltered in the M reg.–26. During Program Count "11" the most significant digit of the multiplicand operand, a digit 3 (see FIGURE 10) is read out of the memory 24 and stored in the A reg.–30. However, the $B_f$ reg.–38 is still storing a digit 1 (bf–1), similar to the 0 PC–3 through 0 PC–20. Therefore, during Program Counts "4" through "7" the address of the least significant digit of the multiplier operand (2–0–4) is again formed and the corresponding operand digit 2 is stored in the B reg.–42. Also, during Program Counts "12" through "17," the address of the most significant digit of the product field, 2–0–5 (see FIGURE 9), is read out of the memory 24 and added to the modified field length digit 1 stored in the $B_f$ reg.–38, the modified multiplicand field length digit 0 stored in the $A_f$ reg.–36 and plus one unit, forming the product field addressed 2–0–7. During Program Count "19" (see FIGURE 11–B) the multiplicand digit 3 is added to itself twice as designated by the multiplier digit 2 stored in the B reg.–42 forming a decimal digit 6. The decimal digit 6 is then stored in the I reg.–30. During the third time the multiplier unit is in Program Count "20," the digit 6 stored in the I reg.–30 is written in the memory storage location 2–0–7.

Also, during Program Count "20" the $A_f$ reg.–36 is storing a digit 0. This indicates the complete multiplicand digit has been multiplied times a multiplier digit. Since there is a possibility that a carry was formed during the multiplication times the most significant multiplicand digit provision is made for storing a carry. To this end, the multiplier unit of FIGURE 3 is arranged to re-enter Program Count "12." This operation is performed in that the gates 150 and 156 (see FIGURE 4A) apply a control signal to the set=11 input of the digits section of the C reg.–28. Also, the gate 218 (see FIGURE 4–O) applies a control signal to the Count −1 line 36c to the $A_f$ reg.–36.

The clock pulse signal at the end of the third Program Count "20" causes Program Count "12" to be entered, the digits section of the C reg.–28 to be set to state "11" and the $A_f$ reg.–36 to be counted down one such that it now stores a decimal number 15.

3 PC–12 through 4 PC–20

During Program Counts "12," "13" and "14," the address of the most significant digit of the product field, the address 2–0–5 (see FIGURE 9) is again read out of the memory 24 and added to the modified multiplier field length digit, a digit 1 stored in the $B_f$ reg.–38 forming a partial product address 2–0–6. However, since the $A_f$ reg.–36 is now storing a decimal number 15, the gate 160 (see FIGURE 4A) applies a control signal to the set=18 input of the Program Counter 132. Therefore, the Program Counter 132 steps directly from Program Count "14" into Program Count "18."

During Program Count "18" the M reg.–26 is storing the partial product storage address 2–0–6. The B reg.–42 was counted to 0 during the last multiplication cycle, therefore, while in Program Count "18" the gates 168 and 172 (see FIGURE 4A) apply a control signal to the set=20 input of the Program Counter 132 and the gates 253 and 252 (see FIGURE 4–X) apply a control signal to the reset input of the first multiplier cycle flip-flop T2.

Thus during the clock pulse at the end of Program Count "18" the multiplier unit steps directly from the Program Count "18" into Program Count "20" and the first multiplier flip-flop T2 is reset to its "0" state, thereby indicating that the least significant digit of the multiplier has been multiplied times each digit of the multiplicand operand.

During Program Count "18" the I reg.–30 was reset and now stores a digit 0. Therefore, during Program Count "20" a digit 0 is written in the storage location 2–0–6 of the memory 24. A digit 0 indicates that there was no carry from the multiplication of the multiplier digit times the most significant multiplicand digit and is used in subsequent multiplication operations.

At this point it will be noted that the product field is storing the same digits as that shown for the first product of Table II.

During Program Count "20" the A$_f$ reg.-36 is storing a decimal number 15 and the B$_f$ reg. is storing a digit "1." Therefore the gate 220 (see FIGURE 4-P) applies a control signal to the count −1 line 38a of the B$_f$ reg.-38 and the gate 144 (see FIGURE 4-A) applies a control signal to the set=1 input of the digits (d) section of the C reg.-28 (see FIGURE 4-V). Thus, the clock pulse signal at the end of Program Count "20" causes Program Count "3" to be re-entered for the second time, the digits (d) section of the C reg.-28 to be set to state "1," and the B$_f$ reg.-38 to decrease the modified field length digit stored therein by one more unit, resulting in a modified field length digit of 0.

4 PC-3 through 5 PC-20

The operations during the following Program Counts "3" through "20" are substantially the same as that during the first time that these Program Counts were entered. Thus, the multiplicand field length digit af is again read out of the memory 24. However, the bf field length digit is not re-read and the B$_f$ reg. -38 now stores a digit 0. Thus during Program Counts "4," "5" and "6," the address of the most significant digit of the multiplier is formed (the address 2–0–3) and the most signficant digit of the multiplier operand (a digit 1) is now read out and stored in the B reg.-42. Again the address of the least significant digit of the multiplicand is formed (the address 2–0–2) and the least signficant digit of the multiplicand (a digit 6) is read out of the memory 24 and stored in the A reg.-40. Since the modified multiplier field length digit stored in the B$_f$ reg.-38 has been decreased to a digit 0, the address of the most significant digit of the product field, the address 2–0–5, is added to the modified multiplicand field length digit, a digit 2, plus 1 unit resulting in the partial product address 2–0–8.

During Program Count "18" the first multiplier flip-flop is in a "0" state and the A$_f$ reg.-36 is not storing a decimal number "15." Therefore the partial product digit 5 stored in the product storage location 2–0–8 (see FIGURE 10, after fourth PC-20) is read out and stored in the I reg.-30.

During Program Count "19" the digit 5 stored in the I reg.-30 is added to the digit 6 stored in the A reg.-40 and the result a numeric digit 1 with a carry of 1 is formed by the adder 34.

At the end of Program Count "19" the numeric digit 1 is stored in the I reg.-30 and the carry digit 1 is stored in the C counter-44.

Thus, following the fifth Program Count "20" a digit 1 is stored in the storage location 2–0–8.

5 PC-3 through 8 PC-21

The operation outlined above may be followed during the subsequent Program Counts of the multiplier in generating the rest of the final product.

During the seventh time the multiplier enters Program Count "20" the most significant digit of the multiplier (a digit 1) has been multiplied times the most significant digit of the multiplicand (a digit 3), and the result is written in the memory 24. At this point the A$_f$ reg.-36 is again storing a digit 0, and a carry cycle is again entered wherein Program steps "12" through "14" are again entered and the address of the most significant position of the partial product field for storing a carry is formed (address 2–0–5) and stored in the M reg.-26. Since there is no carry from the previous multiplication, during the eighth time, the multiplier is in Program Count "20," a digit 0 is stored in the most significant product field storage location (address 2–0–5).

Also, during the eighth time that the multiplier unit is in Program Count "20," the B$_f$ reg.-28 is storing a digit 0, thereby indicating all multiplier digits have been multiplied and the A$_f$ reg.-38 is storing a decimal number 15. Thus the gate 174 (see FIGURE 4-A) applies a control signal at the set=21 input of the Program Counter 132 and the clock pulse at the end of Program Count "20" causes Program Count "21" to be entered.

During Program Count "21" a control signal is applied to the count input of the hundreds (h) and tens (t) sections of the C reg.-28. Also, if each of the controlling gates of FIGURE 3 and FIGURES 4-A through 4-Y are examined, a control signal is applied to the reset input of each of the other flip-flops and registers of the multiplier unit of FIGURE 3. Thus the clock pulse signal at the end of Program Count "21" causes the hundreds (h) and tens (t) sections of the C reg.-38 to increase one unit, thereby forming the word address of the next command (word address 54), and reset all of the other flip-flops and registers to state "0." Also, the multiplier unit re-enters Program Count "1" where the new command now specified by the word address of the C reg.-28 is executed.

TABLE III

A—A reg.-40
a1, a2, a3—three digits of the address of the most significant digit of the multiplicand operand
af—multiplicand field length digit
Add Carry—add carry indicated by carry flip-flop Ca.
A$_f$—A$_f$ reg.-36
a OP—a digit of the multiplicand operand read out of the memory 24
B—B reg.-42
b1, b2, b3—three digits of the address of the most significant digit of the multiplier operand
bf—multiplier field length digit
B$_f$—B$_f$ reg.-38
b OP—a digit of the multiplier operand read out of the memory 24
C—C reg.-28
c1, c2, c3—three digits of the address of the most significant digit of the product storage field
CC—Carry Counter 44
Comp—Complement
c Prod.—partial product digit
d—digits section
d/c—digits section of C reg.-28
FF—flip-flop
h—hundreds section
I—I reg.-30
M—M reg.-26
o—order
Sub. 1—subtract one
t—tens section
Trans.—transfer

What is claimed is:
1. A multiplication unit for a digital computer comprising: memory means for storing operands arranged in digits, and command signals, each command including end digit addresses of both a multiplier operand and a multiplicand operand, and the end digit address of a product field; means for repeatedly reading out of the memory means the end multiplier and multiplicand operand addresses of a command; means responsive to a readout end multiplier operand address for forming a corrected address for each of the digits of the multiplier operand in sequence; means responsive to a read out end multiplicand operand address for forming a corrected address of each of the digits of a multiplicand operand at least once for each different address of the multiplier operand; means for reading out of the memory means each of the digits of the operands in sequence as specified by the corrected end operand addresses; means for storing at least one digit of both the multiplier and multiplicand operands read out of the memory means; arithmetic means for combining the stored operand digits and for forming a partial product digit and an indication of any resulting carry; means for storing the carry indication; means for repeatedly reading out of the memory means the end partial product address of the same com- mand; means responsive to the read out end partial product address for sequentially forming corrected product addresses corresponding to that for storage of each partial product digit; means responsive to the corrected product addresses for writing each of said partial product digits in the corresponding memory means storage location; means responsive to the corrected product addresses for selectively reading out of the corresponding storage location of the memory means a corresponding partial product digit stored therein, said combining means additionally being arranged for selectively combining a stored carry indication and a partial product digit read out of the memory means with the multiplier and multiplicand digits being combined to thereby cause a complete partial product digit to be formed until a complete product composed of partial product digits is written in the memory means.

2. A multiplication unit for a digital computer comprising: memory means for storing operands arranged in digits and command signals each command including end digit addresses of both a multiplier operand and a multiplicand operand, the end digit address of a product field, and separate indications of the field lengths of the corresponding multiplier and multiplicand operands; means for reading out of the memory means the field length indications of a command; multiplier and multiplicand field length counting means adapted to be responsive to the read out field length indications for counting through a number of states representative of the length of the corresponding operands, said multiplicand field length counting means being adapted for counting through a sequence of states corresponding to the length of the corresponding operand once for each count of said multiplier counting means; means for repeatedly reading out of the memory means the end operand addresses of the same command; means for combining the read out end operand addresses with the states of the corresponding counting means and for forming corrected operand digit addresses; means responsive to the corrected operand addresses for reading out of the corresponding memory locations of the memory means the digits of the operands digit by digit; means for storing a digit pair including a multiplier digit and a multiplicand digit read out of the memory means; arithmetic means for combining each different pair of stored multiplier and multiplicand digits together and for forming a series of partial product digits and indications of any resulting carries; means for storing said carry indications, one by one; means for repeatedly reading out of the memory means the end partial product address of the same command; means for combining the read out end partial product address with the states of both said counting means and for forming corrected product addresses corresponding to a sequence of addresses for storage of a product; means responsive to the corrected product addresses for writing the partial product digits, one by one, as they are formed; and means responsive to the corrected product addresses for reading out of the memory means previously formed partial product digits, said arithmetic means additionally being arranged for selectively combining stored carry indications and previously formed partial product digits read out of the memory means with the corresponding multiplier and multiplicand operand digits being combined to form a series of complete partial product digits until a complete product is written in the memory means.

3. A multiplication unit for a digital computer comprising: memory means for storing operand and command signals arranged in digits, each command including end digit addresses of a multiplier operand and a multiplicand operand, and an end digit address of a product field, and at least one digit indicative of the length of the corresponding multiplier and multiplicand operands; means for reading out of the memory means the field length digit of a command; multiplier and multiplicand field length counting means arranged to be responsive to the read out field length digit for counting through states representative of the lengths of the corresponding operands, the multiplicand counting means being adapted for counting through a sequence of states corresponding to the length of the corresponding operand once for each count of said multiplier counting means; means for repeatedly reading out of the memory means the end operand addresses of the same command; means for combining the read out end operand addresses with the states of the corresponding counting means and for forming corrected operand addresses; register means for storing each of said corrected addresses, one by one; means responsive to the stored corrected operand addresses for reading out of the corresponding memory locations of the memory means the digits of the operands digit by digit; means for storing a digit pair including a multiplier digit and a multiplicand digit read out of the memory means; arithmetic means for combining each different pair of stored operand digits together and for forming a series of partial product digits and any resulting carry indications; means for storing said carry indications, one by one; means for repeatedly reading out of the memory means the end partial product address of the same command; means for combining the read out end partial product address with the states of both said counting means and for forming a series of corrected product addresses; means including said address register means for storing the corrected product addresses and adapted for writing in the memory means partial product digits, one by one, as they are formed in the locations designated by said stored and corrected product addresses; and means responsive to the stored and corrected product addresses for reading out of the memory means previously formed partial product digits, said arithmetic means additionally being arranged for selectively combining stored carry indications and previously formed partial product digits read out of said memory means with the corresponding multiplier and multiplicand operand digits being combined to form a series of complete partial product digits until a complete product is written in the memory means.

4. A multiplication unit for a digital computer comprising: magnetic core memory means for storing operand and command signals arranged in digits, said memory means having addressable digit storage locations, each command including at least the address of one of the end digits of both a multiplier operand and a multiplicand operand, and the address of one of the end digits of a product field; means for repeatedly reading out of the memory means the end addresses of multiplier and multiplicand operands of a command; means including counting means for keeping track of the multiplier digits being combined and including means for repeatedly correcting the read out multiplier address and for sequentially forming the addresses of each of the digits of the corresponding multiplier operand progressing a digit address at a time from one end of the operand to the other; means including counting means for keeping track of the multiplicand digits being combined and including means for repeatedly correcting the read out multiplicand address and for sequentially forming the address of each of the digits of the corresponding multiplicand operand at least once for each of the addresses of the multiplier operand digits; means including a register for storing the corrected operand addresses, one by one, and including means for addressing the memory means with the corrected operand addresses for reading out of the memory means each of the digits of the addressed multiplier operand in sequence and for reading out of the memory means each of the digits of the addressed multiplicand operand at least once for each different digit of the multiplier operand read out of the memory means; arithmetic means for individually combining each of the read out multiplicand digits with each of the read out multiplier digits and for forming a series of partial product digits and an indicaon of any resulting carries; means for storing said carry
indications, one by one; means for reading out of the
memory means the end partial product address of the same
command; means including said multiplier and multipli-
cand counting means for correcting the read out end
product address and for sequentially forming a series
of corrected digit addresses of the product field pro-
cessing from the address of one end of the product field
to the address of the other end thereof, said product
address correcting means additionally being operative in
conjunction with said counting means, for forming part of
said product field addresses a plurality of times; means in-
cluding said register for storing the corrected product
addresses, one by one, and adapted for addressing the
memory means with the corrected product addresses, and
for writing the series of partial product digits in the ad-
dressed product storage locations, one by one; and means
including said register for addressing the memory means
with the stored and corrected product addresses and for
selectively reading out of the addressed memory means
the corresponding partial product digits, said combining
means further being adapted for combining the read out
partial product digits and the stored carry indications
with the corresponding multiplier and multiplicand digits
being combined for forming a series of complete partial
product digits to be written in the memory means until
a complete product is stored in the product storage field
of the memory means.

5. A multiplication unit for a digital computer com-
prising: magnetic core memory means for storing oper-
and and command signals arranged in digits each com-
mand including the address of one of the end digits of
both a multiplier operand and a multiplicand operand,
the address in a product field for storage of one of the
end partial product digits of a product, a multiplier
field length digit, and a multiplicand field length digit;
means for reading out of said memory means the multi-
plier and multiplicand field length digits of a command;
individual counting means responsive to the multiplicand
and multiplier field length digits read out of said
memory means for counting relative to the magnitude
of the respective field length digits, said multiplicand
counting means being operative for counting through
states corresponding to the magnitude of the multipli-
cand field length digit at least once for each state of the
multiplier counting means; means for repeatedly read-
ing out of the memory means the end operand addresses
of the same command; information register means for
storing digits read out of said memory, a single digit
at a time, arithmetic means for selectively combining
the digits of the end multiplier and multiplicand oper-
and addresses which are stored in the information
register means with the states of the respective count-
ing means and for forming corrected multiplier and
multiplicand operand addresses; read means including
a register for storing addresses, a single address at a time,
said read means being adapted for storing the cor-
rected multiplier and multiplicand operand addresses, a
single address at a time, and for reading out of the
memory means each of the digits of the multiplier
operand in sequence and for reading out of the memory
means each of the digits of the multiplicand operand at
least once for each different multiplier digit read out
of the memory means; multiplier and multiplicand regis-
ter means for storing a single digit of both the multi-
plier and multiplicand operands read out of the memo-
ry means, said arithmetic means including an adder
means for combining the stored operand digits together
to form a series of partial product digits and indica-
tions of any resulting carry; means for repeatedly read-
ing out of the memory means the end partial product
address of the same command; said arithmetic means
being adapted for combining the read out end partial
product address with each different combination of
states of both said counting means and for forming a
series of corrected product addresses for the storage of
digits in said product field, said address register means
being adapted for storing said corrected product ad-
dresses, one address at a time; means including said ad-
dress register for writing said series of partial product
digits in the stored locations of the product field desig-
nated by said stored and corrected product addresses;
means including said address register for reading out of
the memory means previously formed partial product
digits stored in the storage locations designated by said
stored and corrected product addresses, said arithmetic
means additionally being arranged for selectively com-
bining any stored carry indication resulting from the
combining of the next lower order multiplicand digit
and a previously formed partial product digit read out
of the memory means with the corresponding multi-
plier and multiplicand operand being combined for
forming complete partial product digits for writing in
said memory means until a complete product is written
therein.

6. A multiplication unit for a digital computer com-
prising: magnetic core memory means for storing oper-
and and command signals arranged in digits, each com-
mand including the address of one of the end digits of
both a multiplier operand and a multiplicand operand,
the address of a product field for storage of an end
partial product digit of a product, a multiplier field
length digit, and a multiplicand field length digit, said
memory means including a single digit information regis-
ter through which digits written into and read and of
the memory means are transferred; means for reading
out of said memory means the multiplier and multipli-
cand field length digits of a command; individual count-
ing means arranged to be responsive to the multipli-
cand and multiplier field length digits read out of said
memory means for counting relative to the magnitude
of the respective field length digits, said multiplicand
counting means being operative for counting through
states corresponding to the magnitude of the multi-
plicand field length digit at least once for each state of
the multiplier counting means; means for reading out of
said memory means the end operand addresses of the
same command for each count of the multiplicand
counting means; arithmetic means including an adder
circuit for combining the readout multiplier and multi-
plicand operand addresses with the states of the cor-
responding counting means for forming a corrected
address of each of the digits of a multiplier operand in
sequence and for sequentially forming a corrected ad-
dress of each of the digits of a multiplicand operand at
least once concurrently with each different address of
the multiplier operand; read means, including an address
register for storing a single address at a time including
said corrected operand addresses, said read means be-
ing adapted for reading out of said memory means each
of the digits of the multiplier operand in sequence
as specified by the stored and corrected multiplicand
addresses and for reading out of the memory means each
of the digits of the multiplicand operand at least once
for each different digit of the multiplier operand read
out as specified by the stored and corrected multiplier
addresses; multiplier and multiplicand register means
for storing a single digit of both a multiplier and
a multiplicand operand read out of the memory means;
means including said adder circuit for combining a pair
of stored multiplier and multiplicand operand digits to-
gether and for forming a partial product digit and an
indication of any resulting carry; means for storing the
carry indication formed by said combining means;
means for reading out of the memory means the end
partial product address of the same command with the
forming of each partial product digit; means including
said adder circuit for combining the read out end par-
tial product addresses with the combination of states
of both said counting means and for forming a series of corrected partial product addresses of said product field; means including said address register for storing said corrected partial product addresses, one by one, and for writing the series of partial product digits in the storage locations of the product field specified by said stored and corrected product addresses; means including said address register for reading out of the storage location of the product field, specified by the corrected product addresses, previously formed partial product digits resulting from the combining of the next lower ordered multiplier digits with the combining of a pair of multiplier and multiplicand digits, said arithmetic means additionally being arranged for selectively combining a stored carry indication resulting from the combining of the next lower ordered multiplicand digit and a corresponding partial product digit read out of the memory means with a pair of multiplier and multiplicand operand digits being combined for forming a complete partial product digit for writing in said memory means until a complete product is written therein.

7. A multiplication unit as defined in claim 6 wherein said end product addresses are the addresses of the least significant digits of the operands and product fields, said combining means including means for decreasing the magnitudes of the read out field length digits one unit as they are read out of said memory means, said counting means being arranged for storing the decreased field length digits and means for selectively causing said individual counting means to count and decrease the magnitude of the decreased field length digits stored therein one address value for each different address of the corresponding operand.

8. A multiplication unit as defined in claim 7 wherein said information register means is adapted for storing the read out partial product digits, one by one, said adder circuit being adapted for adding the stored multiplicand digit to the contents of the information register the number of times indicated by the magnitude of the stored multiplier digit and for adding the stored carry indication to the content of the information register, said means for writing being characterized as writing the resulting complete partial product digit stored in the information register in the memory means.

9. A multiplication unit for a digital computer comprising: an addressable memory means with multiplier and multiplicand operands arranged in digits and written therein; means connected for reading out of said memory means, a digit at a time and in order of increasing significance, the digits of a multiplier operand; means connected for reading out of said memory means, a digit at a time, in order of increasing significance, each of the digits of a multiplicand operand at least once each time a different multiplier digit of the same multiplier operand is read out of said memory means; multiplier and multiplicand storing means connected for storing one digit of both the multiplier and multiplicand operands read out of said memory means; arithmetic means including adding circuit means for combining the stored multiplier and multiplicand digits and for forming a partial product digit and an indication of any resulting carry; register means for storing said partial product digit; means for storing said carry indication; means for writing each of said stored partial product digits, one by one, into a product fiield of said memory means; means for selectively reading partial product digits out of the product field of said memory means, one by one, and for storing same in said partial product register means, one by one, with the formation of corresponding partial product digits, said arithmetic means being adapted, during the process of forming a partial product digit and a carry indication, for adding the content of said carry indication storing means to the content of said partial product register means and adapted for adding the content of said multiplicand register means to the content of said partial product register means the number of times indicated by the magnitude of said stored multiplier digit until each of said multiplier digits are combined and a complete product composed of partial product digits are stored in said memory means.

10. A multiplication unit for a digital computer comprising: an addressable magnetic core memory means with multiplier and multiplicand operands arranged in digits and written therein; means connected for reading out of said memory means, a digit at a time and in order of increasing significance, the digits of a multiplier operand, said memory means including an information register through which digits are transferred to and from said memory means; means connected for reading out of said memory means, a digit at a time in order of increasing significance, each of the digits of a multiplicand operand at least once each time a different multiplier digit of the same multiplier operand is read out of said memory means; multiplier and multiplicand register means connected for storing a single digit of both the multiplier and multiplicand operands read out of said memory means; arithmetic means including adding circuit means for combining the stored multiplier and multiplicand digits and for forming a partial product digit and an indication of any resulting carry; said information register means being adapted for directly storing said partial product digits as they are formed; means for storing said carry indication; means for writing each of said stored partial product digits, one by one, into a product field of said memory means; means for selectively reading partial product digits out of the product field of said memory means, one by one, and for storing same in said information register means, one by one, with the formation of a corresponding partial product digit, said arithmetic means being adapted, during the process of forming a partial product digit and a carry indication, for adding the content of said carry indication storing means to the content of said information register means and adapted for adding the content of said multiplicand register means to the content of said information register means, the number of times indicated by the magnitude of said stored multiplier digit until each of said multiplier digits are combined and a complete product composed of partial product digits are stored in said memory means.

11. A multiplication unit for a digital computer comprising: addressable memory means having multiplier and multiplicand operand digits therein; means connected for serially reading out of the memory means all of the digits of a multiplier operand; means for serially reading out of the memory means each of the digits of a multiplicand operand once for each digit of the multiplier operand; means for storing a digit of each operand read out of the memory means; means for storing partial product digits in the memory means; means for serially reading previously stored partial product digits from the memory means; and arithmetic means for completely combining each stored multiplicand digit of an operand with a stored multiplier digit before the next multiplicand digit is combined with such stored multiplier digit and for forming a complete partial product digit and any resulting carry digit corresponding to the product of such multiplicand digit and stored multiplier digit plus a corresponding partial product digit, if any, read from the memory means plus a carry digit, if any, from a preceding combination, said partial product storing means additionally storing said complete partial product digits as they are formed until a complete product composed of partial product digits is written in the memory means.

12. A multiplication unit for a digital computer comprising: addressable memory means having multiplier and multiplicand operand digits therein; means for serially reading out of the memory means all of the digits of a multiplier operand; means for serially reading out of the memory means each of the digits of a multiplicand operand only once for each digit of the multiplier operand; means for storing a digit of each operand read out f the memory means; means for storing partial product digits in the memory means; means for serially reading previously stored partial product digits from the memory means; and arithmetic means for completely combining each stored multiplicand digit of an operand with a stored multiplier digit before the next multiplicand digit is combined with such stored multiplier digit and for forming a complete partial product digit and any resulting carry digit corresponding to the product of such multiplicand digit and stored multiplier digit plus a corresponding partial product digit, if any, read from the memory means plus a carry digit, if any, from a preceding combination, said partial product storing means additionally storing said complete partial product digits as they are formed until a complete product composed of partial product digits is written in the memory means.

13. A multiplication unit for a digital computer comprising: addressable memory means having multiplier and multiplicand operand digits therein; means for serially reading out of the memory means all of the digits of a multiplier operand; means for serially reading out of the memory means each of the digits of a multiplicand operand once for each digit of the multiplier operand; means for storing a digit of each operand read out of the memory means; means for storing any partial product digits in series in the memory as they are formed; means for serially reading previously stored partial product digits from the memory means; means for adding each stored multiplicand digit to itself the number of times designated by the stored multiplier digit before the next multiplicand digit is read and including means for forming a digit representative of a carry from said adding means, said adding means additionally combining a partial product digit read from the memory means and a previously formed carry digit for forming a complete partial product digit and any resulting carry digit corresponding to the product of such stored multiplicand and multiplier digits plus a corresponding partial product digit, if any, read from the memory means plus a carry digit, if any, from a preceding combination, said partial product storing means storing said complete partial product digits as they are formed until a complete product composed of partial product digits is written in the memory means.

14. A multiplication unit for a digital computer comprising: addressable memory means having stored multiplier and multiplicand operand digits; means for serially and repeatedly reading out of the memory means each of the digits of a multiplier operand; means for serially reading out of the memory means each of the digits of a multiplicand operand once for each digit of the multiplier operand; means for storing a digit of each operand read out of the memory means; means for storing partial product digits in the memory means; means for serially reading previously stored partial product digits from the memory means; first counting means for providing a series of counts corresponding to each multiplier digit read from the memory means and for repeating such counts for each multiplier digit once for each multiplicand digit in an operand; adding means for adding each stored multiplicand operand digit to a corresponding partial product digit, if any, read from the memory means plus a carry digit, if any, from a preceding combination once for each of the counts of said first counting means; and second counting means coupled to said adding means and arranged for counting the carries from such additions, said adding means and second counting means forming a complete partial product digit and a carry digit, respectively, corresponding to each such multiplicand digit operated on before the next multiplicand digit is operated on, said partial product storing means storing said complete partial product digits as they are formed until a complete product composed of partial product digits is written in the memory means.

References Cited by the Examiner

UNITED STATES PATENTS 3,161,764  12/1964  Croy _____ 235—160

MALCOLM A. MORRISON, *Primary Examiner.*

M. P. HARTMAN, *Assistant Examiner.*

UNITED STATES PATENT OFFICE
CERTIFICATE OF CORRECTION

Patent No. 3,319,056 May 9, 1967

James R. Bennett

It is hereby certified that error appears in the above numbered patent requiring correction and that the said Letters Patent should read as corrected below.

Column 2, line 12, for "order" read -- ordered --; column 4, line 1, strike out "FIG. 2. Assume that the multiplier operand 12 is to be" and insert instead -- FIG. 2 are time shared with other arithmetic operations --; column 22, line 39, for "30" read -- 36 --; line 67, for "state," read -- state --; column 23, line 6, after "132" insert -- ; the "or" gate 151 --; same line 6, for "(see FIGURE 4-A) into Program" read -- (FIGURE 4-D) --; column 26, line 53, strike out "the", third occurrence; column 29, line 73, for "A reg. -30" read -- A reg. -40 --.

Signed and sealed this 21st day of November 1967.

(SEAL)
Attest:

EDWARD M. FLETCHER, JR.
Attesting Officer

EDWARD J. BRENNER
Commissioner of Patents